US012089645B2

(12) United States Patent
Taurino

(10) Patent No.: US 12,089,645 B2
(45) Date of Patent: Sep. 17, 2024

(54) AEROSOL GENERATING SYSTEM WITH HEATED MIXING CHAMBER

(71) Applicant: Philip Morris Products S.A., Neuchatel (CH)

(72) Inventor: Irene Taurino, Neuchatel (CH)

(73) Assignee: Philip Morris Products S.A., Neuchatel (CH)

( * ) Notice: Subject to any disclaimer, the term of this patent is extended or adjusted under 35 U.S.C. 154(b) by 875 days.

(21) Appl. No.: 16/973,365

(22) PCT Filed: Jun. 11, 2019

(86) PCT No.: PCT/EP2019/065245
§ 371 (c)(1),
(2) Date: Dec. 8, 2020

(87) PCT Pub. No.: WO2019/238704
PCT Pub. Date: Dec. 19, 2019

(65) Prior Publication Data

US 2021/0251286 A1 Aug. 19, 2021

(30) Foreign Application Priority Data

Jun. 12, 2018 (EP) .................................... 18177358

(51) Int. Cl.
*A24F 40/30* (2020.01)
*A24F 40/10* (2020.01)
(Continued)

(52) U.S. Cl.
CPC ............ *A24F 40/465* (2020.01); *A24F 40/30* (2020.01); *A24F 40/42* (2020.01); *A24F 40/46* (2020.01);
(Continued)

(58) Field of Classification Search
CPC .......... A24F 40/10; A24F 40/30; A24F 40/42; A24F 40/46; A24F 40/465; A24F 40/485;
(Continued)

(56) References Cited

U.S. PATENT DOCUMENTS 9,888,714 B2 * 2/2018 Cameron ................ A24F 40/60
10,772,357 B2 * 9/2020 Saygili .................. A61M 15/06
(Continued)

FOREIGN PATENT DOCUMENTS

CN 106793833 A 5/2017
CN 107105791 A 8/2017
(Continued)

OTHER PUBLICATIONS

International Search Report and Written Opinion issued on Aug. 12, 2019 in PCT/EP2019/065245 filed on Jun. 11, 2019.
(Continued)

*Primary Examiner* — Abdullah A Riyami
*Assistant Examiner* — Thang H Nguyen
(74) *Attorney, Agent, or Firm* — Oblon, McClelland, Maier & Neustadt, L.L.P.

(57) ABSTRACT

A cartridge for an aerosol-generating system is provided, including a first compartment containing a nicotine source and having a first air inlet and first air outlet, the inlet being upstream of the outlet; a second compartment containing an acid source and having a second air inlet and second air outlet, the inlet being upstream of the outlet; a mixing chamber for mixing nicotine from the nicotine source and acid from the acid source with an air flow to form an aerosol, the mixing chamber being downstream of both the first air outlet and the second air outlet; and a heating element configured to heat the mixing chamber, at least a portion of the heating element being neither upstream nor downstream of the mixing chamber. An aerosol-generating system and a
(Continued)

method for aerosol generation in an aerosol-generating system are also provided.

14 Claims, 11 Drawing Sheets

(51) Int. Cl.

| | |
|---|---|
| ***A24F 40/42*** | (2020.01) |
| ***A24F 40/46*** | (2020.01) |
| ***A24F 40/465*** | (2020.01) |
| ***A24F 40/485*** | (2020.01) |
| ***B01F 23/21*** | (2022.01) |
| ***B01F 25/421*** | (2022.01) |
| ***B01F 35/92*** | (2022.01) |
| ***H05B 1/02*** | (2006.01) |
| ***H05B 3/40*** | (2006.01) |
| ***H05B 6/06*** | (2006.01) |
| ***H05B 6/10*** | (2006.01) |
| *B01F 35/90* | (2022.01) |

(52) U.S. Cl.
CPC .......... *A24F 40/485* (2020.01); *B01F 23/211* (2022.01); *B01F 25/4231* (2022.01); *B01F 35/92* (2022.01); *H05B 1/0297* (2013.01); *H05B 3/40* (2013.01); *H05B 6/06* (2013.01); *H05B 6/108* (2013.01); *A24F 40/10* (2020.01); *B01F 2035/99* (2022.01)

(58) Field of Classification Search
CPC ................ B01F 2035/99; B01F 23/211; B01F 25/4231; B01F 35/92; H05B 1/0297; H05B 3/40; H05B 6/06; H05B 6/108
See application file for complete search history.

(56) References Cited

U.S. PATENT DOCUMENTS

| | | | | |
|---|---|---|---|---|
| 11,375,749 | B2 * | 7/2022 | Marques Borges .. | A61M 15/06 |
| 2015/0196060 | A1 | 7/2015 | Wensley et al. | |
| 2016/0089508 | A1 * | 3/2016 | Smith ............... | A61M 15/0085 128/202.21 |
| 2016/0106936 | A1 * | 4/2016 | Kimmel ................ | A24F 40/485 392/404 |
| 2016/0206001 | A1 * | 7/2016 | Eng ......................... | A24F 40/30 |
| 2016/0262454 | A1 | 9/2016 | Sears et al. | |
| 2016/0309784 | A1 | 10/2016 | Silvestrini et al. | |
| 2016/0361678 | A1 | 12/2016 | Blackley | |
| 2017/0181475 | A1 | 6/2017 | Cameron | |
| 2017/0258139 | A1 | 9/2017 | Rostami et al. | |
| 2017/0258140 | A1 * | 9/2017 | Rostami ................ | A24F 40/485 |
| 2017/0340014 | A1 * | 11/2017 | Batista .................. | A24F 40/485 |
| 2018/0184716 | A1 * | 7/2018 | Song ...................... | A24F 40/485 |
| 2018/0228216 | A1 * | 8/2018 | Saygili ................. | A61M 11/042 |
| 2018/0295887 | A1 * | 10/2018 | Cyphert ................. | H05B 6/105 |
| 2019/0289909 | A1 * | 9/2019 | Hejazi ..................... | A24F 40/42 |
| 2020/0120984 | A1 * | 4/2020 | Rogan ..................... | A24F 40/46 |

FOREIGN PATENT DOCUMENTS

| | | | |
|---|---|---|---|
| CN | 107921224 | A | 4/2018 |
| EP | 3 305 107 | A2 | 4/2018 |
| JP | 2018-502586 | A | 2/2018 |
| KR | 10-2011-0139238 | A | 12/2011 |
| KR | 10-2015-0129683 | A | 11/2015 |
| WO | WO 2008/121610 | A1 | 10/2008 |
| WO | WO 2016/120344 | A2 | 8/2016 |
| WO | WO 2017/032695 | A1 | 3/2017 |
| WO | WO 2017/108987 | A1 | 6/2017 |
| WO | WO 2017/163046 | A1 | 9/2017 |
| WO | WO 2018/019578 | | 2/2018 |
| WO | WO 2018/099999 | A1 | 6/2018 |

OTHER PUBLICATIONS

Japanese Office Action issued Jul. 27, 2023 in Japanese Patent Application No. 2020-564838, 2 pages.
Japanese Office Action issued Jul. 27, 2023 in Japanese Patent Application No. 2020-564838, (reference previously filed, now submitting English translation only), 5 pages.
Korean Office Action issued Oct. 25, 2023 in Korean Patent Application No. 10-2020-7034532 (with English Translation), 11 pages.
Combined Chinese Office Action and Search Report issued Oct. 27, 2023 in Chinese Patent Application No. 201980033598.5 (with English Translation), 15 pages.

* cited by examiner

AEROSOL GENERATING SYSTEM WITH HEATED MIXING CHAMBER

CROSS-REFERENCE TO RELATED APPLICATIONS

This application is a U.S. national stage application of PCT/EP2019/065245, filed on Jun. 11, 2019, which is based upon and claims the benefit of priority under 35 U.S.C. § 119 from European patent application no. 18177358.1, filed Jun. 12, 2018, the entire contents of each of which are incorporated herein by reference.

TECHNICAL FIELD

The invention relates to cartridges for use in aerosol-generating systems, aerosol-generating systems, and a method for aerosol generation. In particular, the invention relates to cartridges comprising a nicotine source and an acid source for use in an aerosol-generating system for the in situ generation of an aerosol comprising nicotine, and aerosol-generating systems comprising such cartridges.

DESCRIPTION OF THE RELATED ART

Devices for delivering nicotine to a user which comprise a nicotine source and a volatile delivery enhancing compound source are known. For example, WO 2008/121610 A1 discloses devices in which nicotine and a volatile acid are reacted with one another in the gas phase to form an aerosol that is inhaled by the user.

However, in such devices, the aerosol delivered to the user contains a proportion of unreacted nicotine and a proportion of unreacted acid. It is an object of the invention to provide a cartridge for use in an aerosol-generating system, or an aerosol-generating system comprising such a cartridge, which may improve the aerosol delivered to a user. In particular, an objection of the present invention is to reduce the proportion of unreacted nicotine in the aerosol delivered to the user.

SUMMARY

According to a first aspect of the invention, there is provided a cartridge for use in an aerosol-generating system. The cartridge comprises a first compartment having a first air inlet and a first air outlet, the first air inlet being upstream of the first air outlet. The first compartment contains a nicotine source. The cartridge comprises a second compartment having a second air inlet and a second air outlet, the second air inlet being upstream of the second air outlet. The second compartment contains an acid source. The cartridge comprises a mixing chamber for mixing nicotine from the nicotine source in the first compartment and acid from the acid source in the second compartment with an air flow to form an aerosol. The mixing chamber is downstream of both the first air outlet of the first compartment and the second air outlet of the second compartment. The cartridge comprises a heating element configured to heat the mixing chamber, wherein at least a portion of the heating element is neither upstream nor downstream of the mixing chamber.

According to a second aspect of the invention, there is provided an aerosol-generating system comprising a cartridge according to the first aspect of the invention and an aerosol-generating device. The aerosol-generating device comprises a power supply and the power supply supplies power to the heating element when the cartridge is engaged with the aerosol-generating device.

According to a third aspect of the invention, there is provided an aerosol-generating system comprising a cartridge for use in the aerosol-generating system. The cartridge comprises a first compartment having a first air inlet and a first air outlet, the first air inlet being upstream of the first air outlet. The first compartment contains a nicotine source. The cartridge comprises a second compartment having a second air inlet and a second air outlet, the second air inlet being upstream of the second air outlet. The second compartment contains an acid source. The cartridge comprises a mixing chamber for mixing nicotine from the nicotine source and acid from the acid source with an air flow to form an aerosol, the mixing chamber being downstream of both the first air outlet of the first compartment and the second air outlet of the second compartment. The aerosol-generating system comprises a heating element configured to heat the mixing chamber and an aerosol-generating device. The aerosol-generating device comprises a housing and a power supply. The power supply is configured to supply power to the heating element. In use, at least a portion of the cartridge engages the housing, and at least a portion of the heating element is neither upstream nor downstream of the mixing chamber.

According to a fourth aspect of the invention, there is provided a cartridge for use in an aerosol-generating system, the cartridge comprising a first compartment containing a nicotine source; a second compartment containing an acid source: a mixing chamber for mixing nicotine from the nicotine source and acid from the acid source with an air flow to form an aerosol; and a heating element configured to heat the mixing chamber. In use, at least a portion of the heating element is configured to heat the mixing chamber to a temperature of between 60 degrees Centigrade and 80 degrees Centigrade, or between 70 degrees Centigrade and 80 degrees Centigrade.

According to a fifth aspect of the invention, there is provided an aerosol-generating system comprising a cartridge for use in the aerosol-generating system. The cartridge comprises a first compartment containing a nicotine source, a second compartment containing an acid source, and a mixing chamber for mixing nicotine from the nicotine source and acid from the acid source with an air flow to form an aerosol. The aerosol-generating system comprises an aerosol-generating device. The aerosol-generating device comprises a heating element and a housing, the housing defining a cavity for receiving at least a portion of the cartridge, wherein, in use, at least a portion of the cartridge engages the housing, and at least a portion of the heating element is configured to heat the mixing chamber to a temperature of between 60 degrees Centigrade and 80 degrees Centigrade, or between 70 degrees Centigrade and 80 degrees Centigrade.

According to a sixth aspect of the invention, there is provided a method for improving aerosol formation in an aerosol-generating system. The aerosol-generating system comprises a cartridge for use in the aerosol-generating system. The cartridge comprises a first compartment containing a nicotine source, a second compartment containing an acid source, and a mixing chamber for mixing nicotine from the nicotine source and acid from the acid source with an air flow to form an aerosol. The aerosol-generating system further comprises a heater and an aerosol-generating device. The aerosol-generating device comprises a housing. In use, the housing of the aerosol-generating device engages at least a portion of the cartridge.

BRIEF DESCRIPTION OF THE DRAWINGS

The invention will be further described, by way of example only, with reference to the accompanying drawings, in which.

DETAILED DESCRIPTION

Figure 1:
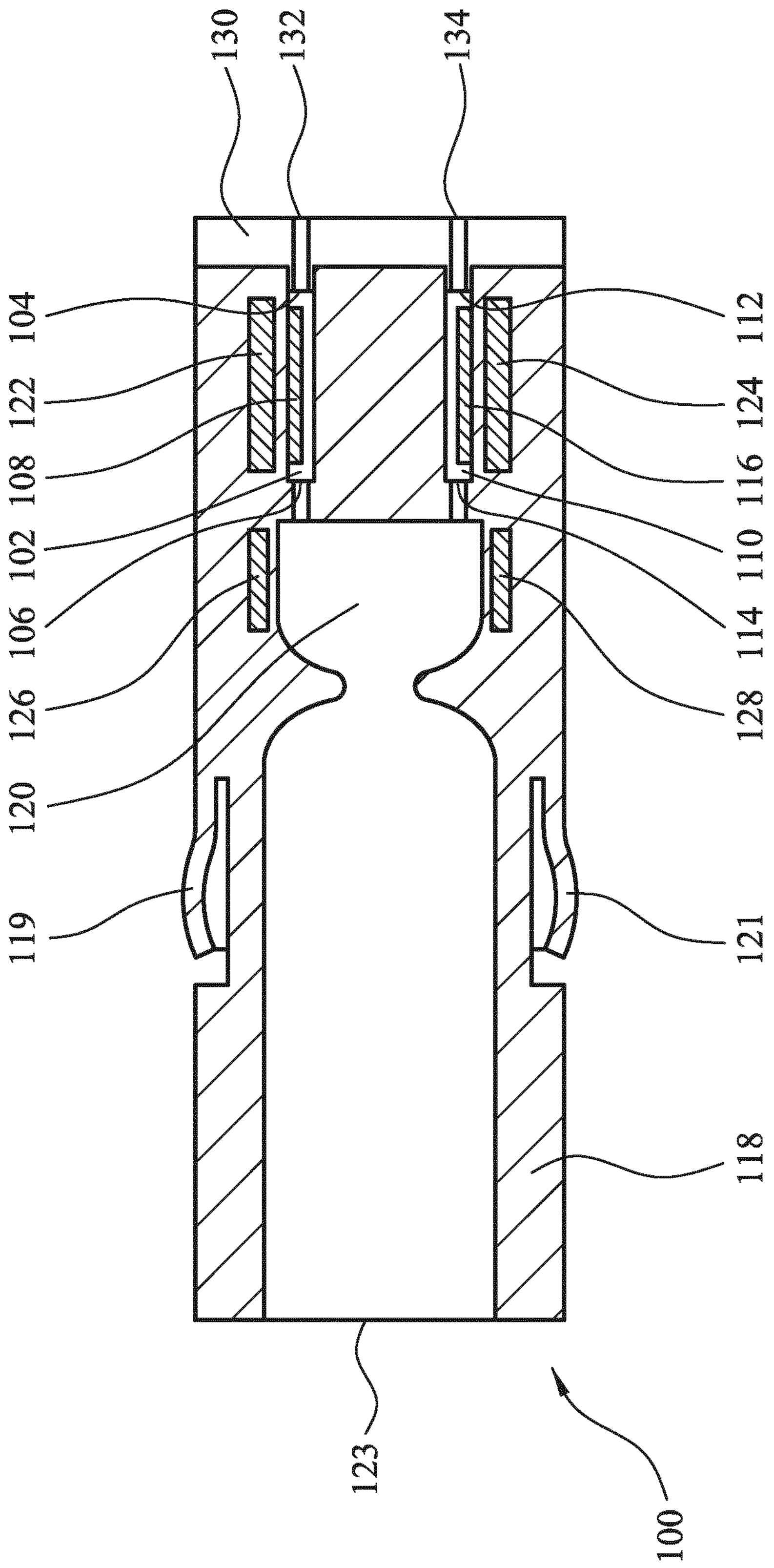
FIG. 1 is a schematic illustration of a cartridge for use in an aerosol-generating system.

As used herein with reference to the invention, the term "air inlet" is used to describe one or more apertures through which air may be drawn into a component, or a portion of a component.

As used herein with reference to the invention, the term "air outlet" is used to describe one or more apertures through which air may be drawn out of a component, or a portion of a component.

As used herein with reference to the invention, the terms "upstream" and "downstream" describe the relative positions of components, or portions of components, of the cartridge or the aerosol-generating system in relation to the direction in which the air flow is transported through the cartridge or aerosol-generating system during use.

According to the first aspect of the invention, the cartridge comprises a heating element configured to heat the mixing chamber, wherein at least a portion of the heating element is neither upstream nor downstream of the mixing chamber. Advantageously, this heating element can heat the mixing chamber to increase the rate of reaction between nicotine and acid in the mixing chamber. Thus, the aerosol delivered to the user may contain less unreacted nicotine, or less unreacted acid, or less unreacted nicotine and less unreacted acid, or more aerosol may be formed, or the mixing chamber may be made shorter without compromising the aerosol-generating system's ability to deliver an appropriate amount of reacted nicotine. Further, providing a portion of the heating element neither upstream nor downstream of the mixing chamber allows the mixing chamber to be heated to a desired temperature without other parts of the aerosol-generating system getting too hot.

According to the first aspect of the invention, at least a portion of the heating element is neither upstream nor downstream of the mixing chamber. The heating element may be in a flow path of the air flow. That is, the air flow may contact the heating element. The at least a portion of the heating element which is neither upstream nor downstream of the mixing chamber may be within the mixing chamber. The heating element may be entirely within the mixing chamber. At least a portion of the heating element may be within the mixing chamber. The heating element may be entirely outside of the mixing chamber.

The heating element may be configured to heat the mixing chamber to a temperature of between 60 degrees Centigrade and 80 degrees Centigrade, or between 70 degrees Centigrade and 80 degrees Centigrade.

The heating element may comprise a susceptor. The heating element may comprise an electrically resistive heating element. The heating element may comprise an infra-red heating element. The heating element may comprise a photonic source.

At least a portion of the mixing chamber may be positioned between the first compartment and the second compartment. Advantageously, this may allow the cartridge to be made shorter without shortening the mixing chamber.

The mixing chamber may comprise one or more flow obstructions which change a flow direction of at least a portion of the air flow. For example, the mixing chamber may comprise one or more flow obstructions which reverse a flow direction of at least a portion of the air flow. The mixing chamber may comprise one or more flow obstructions which accelerate or decelerate at least a portion of the air flow. The mixing chamber may comprise a plurality of flow obstructions. The plurality of flow obstructions may accelerate and then decelerate, or decelerate then accelerate, at least a portion of the air flow. The one or more flow obstructions may be defined at least partially by one or more walls of the mixing chamber.

As used herein with reference to the invention, the term "flow obstruction" is used to describe an obstacle, or restriction, which contacts at least a portion of the air flow and thereby changes a flow direction, or a flow speed, or both a flow direction and a flow speed, of at least a portion of the air flow.

At least a portion of the heating element may be positioned adjacent to, or within, the mixing chamber. The entire heating element may be positioned adjacent to, or within, the mixing chamber.

The heating element may be an electrically resistive wire coil and at least a portion of the wire coil may be positioned around at least a portion of the mixing chamber.

A first portion of the heating element may be configured to heat the first compartment or the second compartment or both the first compartment and the second compartment, and a second portion of the heating element may be configured to heat the mixing chamber.

A first portion of the heating element may be positioned adjacent to the first compartment or the second compartment or both the first compartment and the second compartment, and a second portion of the heating element may be positioned adjacent to, or within, the mixing chamber.

In use, a temperature of the first compartment or a temperature of the second compartment or both a temperature of the first compartment and a temperature of the second compartment may not exceed 250 degrees Centigrade, preferably 200 degrees Centigrade, more preferably 150 degrees Centigrade.

In use, the heating element may be configured to heat the mixing chamber to between 60 degrees Centigrade and 80 degrees Centigrade, or between 70 degrees Centigrade and 80 degrees Centigrade, without a temperature of the first compartment or a temperature of the second compartment or both a temperature of the first compartment and a temperature of the second compartment exceeding 250 degrees Centigrade, preferably without exceeding 200 degrees Centigrade, more preferably without exceeding 150 degrees Centigrade.

According to a second aspect of the invention, there is provided an aerosol-generating system comprising a cartridge according to the first aspect of the invention and an aerosol-generating device. The aerosol-generating device comprises a power supply and the power supply supplies power to the heating element when the cartridge is engaged with the aerosol-generating device.

The cartridge may comprise electrical cartridge contacts connected to the heating element and the aerosol-generating device may comprise electrical device contacts connected to the power supply. When the cartridge is engaged with the aerosol-generating device, the electrical cartridge contacts may contact the electrical device contacts, thus connecting the power supply to the heating element.

The aerosol-generating device may comprise a second heating element, at least a portion of the second heating element being configured to heat the first compartment or the second compartment or both the first compartment and the second compartment. The power supply in the aerosol-generating device may supply power to the second heating element.

According to a third aspect of the invention, there is provided an aerosol-generating system comprising a cartridge for use in the aerosol-generating system. The cartridge comprises a first compartment having a first air inlet and a first air outlet, the first air inlet being upstream of the first air outlet. The first compartment contains a nicotine source. The cartridge comprises a second compartment having a second air inlet and a second air outlet, the second air inlet being upstream of the second air outlet. The second compartment contains an acid source. The cartridge comprises a mixing chamber for mixing nicotine from the nicotine source and acid from the acid source with an air flow to form an aerosol, the mixing chamber being downstream of both the first air outlet of the first compartment and the second air outlet of the second compartment. The aerosol-generating system comprises a heating element configured to heat the mixing chamber and an aerosol-generating device. The aerosol-generating device comprises a housing and a power supply. The power supply is configured to supply power to the heating element. In use, at least a portion of the cartridge engages the housing, and at least a portion of the heating element is neither upstream nor downstream of the mixing chamber.

According to the third aspect of the invention, the heating element may be provided in the cartridge or in the aerosol-generating device.

The housing may define a cavity for receiving at least a portion of the cartridge. In use, at least a portion of the cartridge may be received in the cavity defined by the housing.

According to a fourth aspect of the invention, there is provided a cartridge for use in an aerosol-generating system, the cartridge comprising a first compartment containing a nicotine source; a second compartment containing an acid source; a mixing chamber for mixing nicotine from the nicotine source and acid from the acid source with an air flow to form an aerosol; and a heating element configured to heat the mixing chamber. In use, at least a portion of the heating element is configured to heat the mixing chamber to a temperature of between 60 degrees Centigrade and 80 degrees Centigrade, or between 70 degrees Centigrade and 80 degrees Centigrade.

According to a fifth aspect of the invention, there is provided an aerosol-generating system comprising a cartridge for use in the aerosol-generating system. The cartridge comprises a first compartment containing a nicotine source, a second compartment containing an acid source, and a mixing chamber for mixing nicotine from the nicotine source and acid from the acid source with an air flow to form an aerosol. The aerosol-generating system comprises an aerosol-generating device. The aerosol-generating device comprises a heating element and a housing, the housing defining a cavity for receiving at least a portion of the cartridge, wherein, in use, at least a portion of the cartridge engages the housing, and at least a portion of the heating element is configured to heat the mixing chamber to a temperature of between 60 degrees Centigrade and 80 degrees Centigrade, or between 70 degrees Centigrade and 80 degrees Centigrade.

The housing may define a cavity for receiving at least a portion of the cartridge. In use, at least a portion of the cartridge may be received in the cavity defined by the housing.

According to a sixth aspect of the invention, there is provided a method for improving aerosol formation in an aerosol-generating system. The aerosol-generating system comprises a cartridge for use in the aerosol-generating system. The cartridge comprises a first compartment containing a nicotine source, a second compartment containing an acid source, and a mixing chamber for mixing nicotine from the nicotine source and acid from the acid source with an air flow to form an aerosol. The aerosol-generating system further comprises a heater and an aerosol-generating device. The aerosol-generating device comprises a housing. In use, the housing of the aerosol-generating device engages at least a portion of the cartridge.

The heater may comprise a first portion and a second portion. If the heater comprises a first portion and a second portion, the method comprises supplying power to the heater such that a first portion of the heater heats the first compartment or the second compartment or both the first compartment and the second compartment, and a second portion of the heater heats the mixing chamber. The heater may comprise a first heating element and a second heating element.

If the heater comprises a first heating element and a second heating element, the method comprises supplying power to the first heating element such that the first heating element heats the first compartment or the second compartment or both the first compartment and the second compartment, and supplying power to the second heating element such that the second heating element heats the mixing chamber.

According to any of the fourth, fifth and sixth aspects of the invention, the cartridge comprises a first compartment and a second compartment. The first compartment may have a first air inlet and a first air outlet, the first air inlet being upstream of the first air outlet. The second compartment may have a second air inlet and a second air outlet, the second air inlet being upstream of the second air outlet. The mixing chamber may be downstream of the first air outlet and the second air outlet.

DETAILED DESCRIPTION

The cartridge may be formed from any suitable material or combination of materials. Suitable materials include, but are not limited to, aluminium, polyether ether ketone (PEEK), polyimides, such as KAPTON®, polyethylene terephthalate (PET), polyethylene (PE), high-density polyethylene (HDPE), polypropylene (PP), polystyrene (PS), fluorinated ethylene propylene (FEP), polytetrafluoroethylene (PTFE), polyoxymethylene (POM), epoxy resins, polyurethane resins, vinyl resins, liquid crystal polymers (LCP), and modified LCPs, such as LCPs with graphite or glass fibres.

The cartridge may have a length of between about 20 millimetres and about 60 millimetres, preferably between about 30 and about 50 millimetres, more preferably between about 35 millimetres and about 45 millimetres.

The cartridge may have a diameter of between about 5 millimetres and about 10 millimetres, preferably between about 6 millimetres and about 9 millimetres, more preferably between about 7 millimetres and about 8 millimetres.

The cartridge may comprise a seal extending across the upstream end of the cartridge. The seal may be secured to the cartridge about a periphery of the seal. The seal may seal the first air inlet and the second air inlet. The seal may be secured to the cartridge by at least one of an adhesive and a weld, such as an ultrasonic weld. The seal may be formed from a sheet of material. The sheet of material may comprise at least one of a polymeric film and a metallic foil.

The seal may be a frangible seal configured to be pierced by a piercing element on an aerosol-generating device.

The seal may be a removable seal configured to be removed by a user before using the cartridge assembly. The removable seal may comprise a pull tab to facilitate removal of the seal by a user.

The first air outlet may comprise a single first air outlet aperture, or the first air outlet may comprise a plurality of first air outlet apertures, each first air outlet aperture in fluid communication with the downstream end of the first compartment. The total flow area of the first air outlet is the sum of the flow areas of the one or more first air outlet apertures.

The second air outlet may comprise a single second air outlet aperture, or the second air outlet may comprise a plurality of second air outlet apertures, each second air outlet aperture in fluid communication with the downstream end of the second compartment. The total flow area of the second air outlet is the sum of the flow areas of the one or more second air outlet apertures.

The total flow area of the first air outlet may be the same as the total flow area of the second air outlet. The total flow area of the first air outlet may be different to the total flow area of the second air outlet. Different total flow areas may be selected to provide different flow rates of air through each of the first compartment and the second compartment. Providing different flow rates through the first and second compartments may account for a difference between a vapour pressure of a first volatile compound in the nicotine source in the first compartment and a vapour pressure of a second volatile compound in the acid source in the second compartment at the same temperature. Where the first and second volatile compounds undergo a chemical reaction with each other to form a reaction product for delivery to a user, providing different flow rates through the first and second compartments may provide a desired reaction stoichiometry between the first and second volatile compounds downstream of the cartridge.

The features described herein with respect to the first and second air outlets may apply to the first and second air inlets. That is, each of the first and second air inlets may comprise one or more air inlet apertures. The total flow area of the first air inlet may be the same as the total flow area of the second air inlet. The total flow area of the first air inlet may be different to the total flow area of the second air inlet.

According to any of the aspects of the invention, the nicotine source may comprise a first carrier material impregnated with between about 1 milligram and about 50 milligrams of nicotine. The nicotine source may comprise a first carrier material impregnated with between about 1 milligram and about 40 milligrams of nicotine. Preferably, the nicotine source comprises a first carrier material impregnated with between about 3 milligrams and about 30 milligrams of nicotine. More preferably, the nicotine source comprises a first carrier material impregnated with between about 6 milligrams and about 20 milligrams of nicotine. Most preferably, the nicotine source comprises a first carrier material impregnated with between about 8 milligrams and about 18 milligrams of nicotine.

If the first carrier material is impregnated with a nicotine base or a nicotine salt, the amount of nicotine recited herein is the amount of nicotine base or the amount of ionised nicotine respectively.

The first carrier material may be impregnated with liquid nicotine or a solution of nicotine in an aqueous or non-aqueous solvent.

The first carrier material may be impregnated with natural nicotine or synthetic nicotine.

According to any of the aspects of the invention comprising an acid source, the acid source may comprise an organic acid or an inorganic acid.

The acid source may comprise an organic acid, more preferably a carboxylic acid, most preferably an alpha-keto or 2-oxo acid or lactic acid.

Advantageously, the acid source may comprise an acid selected from the group consisting of 3-methyl-2-oxopentanoic acid, pyruvic acid, 2-oxopentanoic acid, 4-methyl-2-oxopentanoic acid, 3-methyl-2-oxobutanoic acid, 2-oxooctanoic acid, lactic acid and combinations thereof. Advantageously, the acid source may comprise pyruvic acid or lactic acid. More advantageously, the acid source may comprise lactic acid.

Advantageously, the acid source may comprise a second carrier material impregnated with acid.

The first carrier material and the second carrier material may be the same or different.

Advantageously, one or both of the first carrier material and the second carrier material may have a density of between about 0.1 grams/cubic centimetre and about 0.3 grams/cubic centimetre.

Advantageously, one or both of the first carrier material and the second carrier material may have a porosity of between about 15 percent and about 55 percent.

One or both of the first carrier material and the second carrier material may comprise one or more of glass, cellulose, ceramic, stainless steel, aluminium, polyethylene (PE), polypropylene, polyethylene terephthalate (PET), poly(cyclohexanedimethylene terephthalate) (PCT), polybutylene terephthalate (PBT), polytetrafluoroethylene (PTFE), expanded polytetrafluoroethylene (ePTFE), and BAREX®.

The first carrier material may act as a reservoir for the nicotine.

Advantageously, the first carrier material may be chemically inert with respect to nicotine.

The first carrier material may have any suitable shape and size. For example, the first carrier material may be in the form of a sheet or plug.

Advantageously, the shape and size of the first carrier material may be similar to the shape and size of the first compartment of the cartridge.

The shape, size, density and porosity of the first carrier material may be chosen to allow the first carrier material to be impregnated with a desired amount of nicotine.

Advantageously, the first compartment of the cartridge may further comprise a flavourant. Suitable flavourants include, but are not limited to, menthols.

Advantageously, the first carrier material may be impregnated with between about 3 milligrams and about 12 milligrams of flavourant.

The second carrier material may act as a reservoir for the acid.

Advantageously, the second carrier material may be chemically inert with respect to the acid.

The second carrier material may have any suitable shape and size. For example, the second carrier material may be in the form of a sheet or plug.

Advantageously, the shape and size of the second carrier material may be similar to the shape and size of the second compartment of the cartridge.

The shape, size, density and porosity of the second carrier material may be chosen to allow the second carrier material to be impregnated with a desired amount of acid.

Advantageously, acid source may be a lactic acid source comprising a second carrier material impregnated with between about 2 milligrams and about 60 milligrams, preferably between about 5 milligrams and about 50 milligrams, more preferably between about 8 milligrams and about 40 milligrams, most preferably between about 10 milligrams and about 30 milligrams, of lactic acid.

The shape and dimensions of the first compartment of the cartridge may be chosen to allow a desired amount of nicotine to be contained within the cartridge.

The shape and dimensions of the second compartment of the cartridge may be chosen to allow a desired amount of acid to be contained within the cartridge.

The ratio of nicotine and acid required to achieve an appropriate reaction stoichiometry may be controlled and balanced through variation of the volume of the first compartment relative to the volume of the second compartment.

According to any of the aspects of the invention comprising a first compartment and a second compartment, the first compartment of the cartridge may be coated with one or more nicotine-resistant materials and the second compartment of the cartridge may be coated with one or more acid-resistant materials. This may advantageously enhance the shelf life of the cartridge.

Examples of suitable nicotine-resistant materials and acid-resistant materials include, but are not limited to, polyethylene (PE), polypropylene (PP), polystyrene (PS), fluorinated ethylene propylene (FEP), polytetrafluoroethylene (PTFE), epoxy resins, polyurethane resins, vinyl resins and combinations thereof.

According to any aspects of the invention comprising an electrically resistive heating element, the electrically resistive heating element preferably comprises an electrically resistive material. Suitable electrically resistive materials include, but are not limited to, semiconductors such as doped ceramics, electrically "conductive" ceramics (such as molybdenum disilicide), carbon, graphite, metals, metal alloys and composite materials made of a ceramic material and a metallic material. Such composite materials may comprise doped or undoped ceramics. Examples of suitable doped ceramics include doped silicon carbides. Examples of suitable metals include titanium, zirconium, tantalum, and metals from the platinum group. Examples of suitable metal alloys include Constantan, stainless steel, nickel-, cobalt-, chromium-, aluminium-titanium-zirconium-, hafnium-, niobium-, molybdenum-, tantalum-, tungsten-, tin-, gallium-, manganese- and iron-containing alloys, and super-alloys based on nickel, iron, cobalt, stainless steel, TIMETAL®, iron-aluminium based alloys and iron-manganese-aluminium based alloys. TIMETAL® is a registered trademark of Titanium Metals Corporation, 1999 Broadway Suite 4300, Denver Colorado. In composite materials, the electrically resistive material may optionally be embedded in, encapsulated or coated with an insulating material or vice-versa, depending on the kinetics of energy transfer and the external physicochemical properties required. The heating element may comprise a metallic etched foil insulated between two layers of an inert material. In that case, the inert material may comprise KAPTON®, all-polyimide or mica foil. KAPTON® is a registered trademark of E.I. du Pont de Nemours and Company. 1007 Market Street, Wilmington, Delaware 19898, United States of America.

The susceptor may be formed partially, or entirely, from one or more susceptor materials. Susceptor materials include, but are not limited to, graphite, molybdenum, silicon carbide, stainless steels, niobium, aluminium, nickel, nickel containing compounds, titanium, and composites of metallic materials. Preferred susceptor materials comprise a metal, metal alloy or carbon. Advantageously, susceptor materials may comprise a ferromagnetic material, for example, ferritic iron, a ferromagnetic alloy, such as ferromagnetic steel or stainless steel, ferromagnetic particles, and ferrite. A susceptor material may be, or comprise, aluminium. A susceptor material preferably comprises more than 5 percent, preferably more than 20 percent, more preferably more than 50 percent or more than 90 percent of ferromagnetic or paramagnetic materials.

The aerosol-generating device or cartridge may advantageously comprise an inductive heater which, in use, partially or totally surrounds the susceptor. In use, the inductive heater inductively heats the susceptor.

The aerosol-generating device or cartridge may comprise an inductor coil disposed around at least a portion of the susceptor. In use, a power supply and a controller connected to the inductor coil may provide an alternating electric current to the inductor coil such that the inductor coil may generate an alternating magnetic field to heat the susceptor.

The housing of the aerosol-generating device may comprise any suitable material or combination of materials. Examples of suitable materials for the housing include metals, alloys, plastics or composite materials containing one or more of those materials, or thermoplastics that are suitable for food or pharmaceutical applications, for example polypropylene, polyetheretherketone (PEEK) and polyethylene. Preferably, the material for the housing is light and non-brittle.

The aerosol-generating device may be portable. The aerosol-generating device may be a smoking device and may have a size comparable to a conventional cigar or cigarette. The smoking device may have a total length between approximately 30 mm and approximately 150 mm. The smoking device may have an external diameter between approximately 5 mm and approximately 30 mm.

Features described in relation to one aspect of the invention may be applicable to another aspect of the invention. In particular, features described in relation to the first aspect of the invention may be applicable to the second, third, fourth, fifth and sixth aspects of the invention. For example, features relating to the heating element of the cartridge of the first aspect of the invention may be applicable to the heating elements of the cartridges or aerosol-generating systems of the second, third, fourth, fifth and sixth aspects of the invention.

FIG. 1 is a schematic illustration of a cartridge for use in an aerosol-generating system in accordance with a first embodiment. The cartridge 100 comprises a first compartment 102 having a first air inlet 104 and a first air outlet 106. The first compartment 102 contains a nicotine source 108 comprising a first carrier material impregnated with nicotine and menthol. The cartridge 100 further comprises a second compartment 110 having a second air inlet 112 and a second air outlet 114. The second compartment 110 contains an acid source 116 comprising a second carrier material impregnated with lactic acid. The cartridge 100 further comprises a cartridge housing body 118 defining engaging cartridge portions 119, 121, a mixing chamber 120 and a cartridge exit 123. The mixing chamber 120 is positioned between the first and second compartment air outlets 106, 114 and the cartridge exit 123. The cartridge 100 further comprises a cap 130 with a first cap aperture 132 and a second cap aperture 134. The cap 130 is positioned upstream of the first and second compartment air inlets 104, 112.

The cartridge 100 further comprises a first heating element 122, a second heating element 124, a third heating element 126, and a fourth heating element 128. The first heating element 122 is adjacent to the first compartment 102 and, in use, heats the nicotine source 108 to volatise a nicotine compound. The second heating element 124 is adjacent to the second compartment 110 and, in use, heats the acid source 116 to volatise an acid compound. The third heating element 126 and the fourth heating element 128 are adjacent to the mixing chamber 120. In use, the third heating element 126 and the fourth heating element 128 heat the mixing chamber. The first, second, third, and fourth heating elements are all susceptors, though the cartridge 100 would function in much the same way if one or more of these heating elements were electrically resistive heating elements with connection to a power source.

Figure 2:
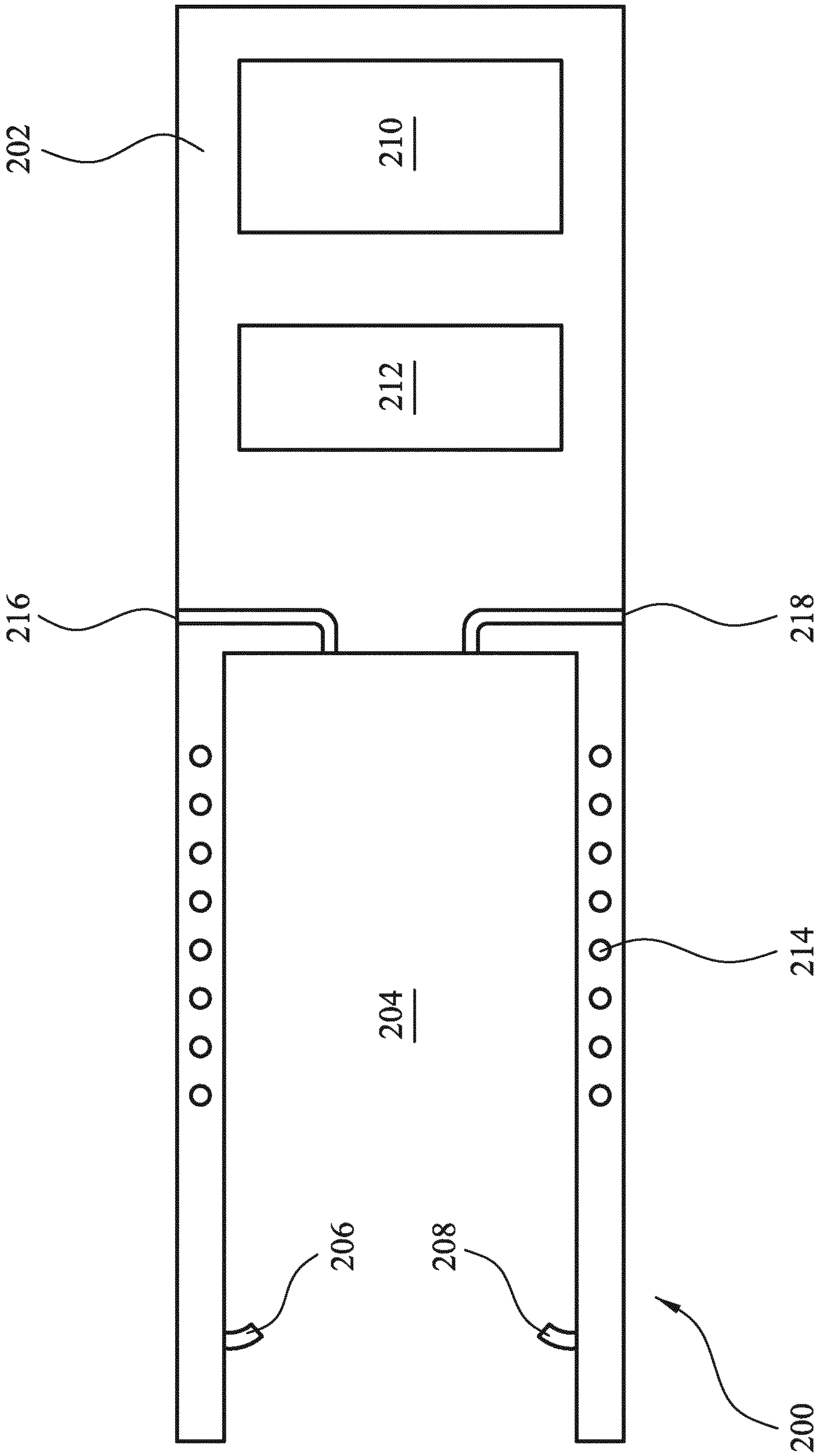
FIG. 2 is a schematic illustration of an aerosol-generating device.

FIG. 2 is a schematic illustration of an aerosol-generating device. The aerosol-generating device 200 is compatible with the cartridge 100 shown in FIG. 1. The aerosol-generating device 200 comprises a device housing 202 which defines a cavity 204 and a first engaging device portion 206 and a second engaging device portion 208. The aerosol-generating device further comprises a power supply 210 connected to a controller 212. In this embodiment, the power supply is a lithium ion battery, though any suitable power supply may be used. The aerosol-generating device 200 further comprises an inductor coil 214 disposed around a portion of the cavity 204. The inductor coil 214 is connected to the controller 212. The controller 212 is configured to control the power supplied from the power supply 210 to the inductor coil 214. The aerosol-generating device further comprises a first air inlet 216 and a second air inlet 218. The aerosol-generating device further comprises a flow sensor (not shown) configured to detect an air flow through an air flow passage in the aerosol-generating device. The flow sensor is connected to the controller 212.

In use, the power supply 210 and the controller 212 connected to the inductor coil 214 provide an alternating electric current to the inductor coil 214 such that the inductor coil 214 generates an alternating magnetic field.

Figure 3:
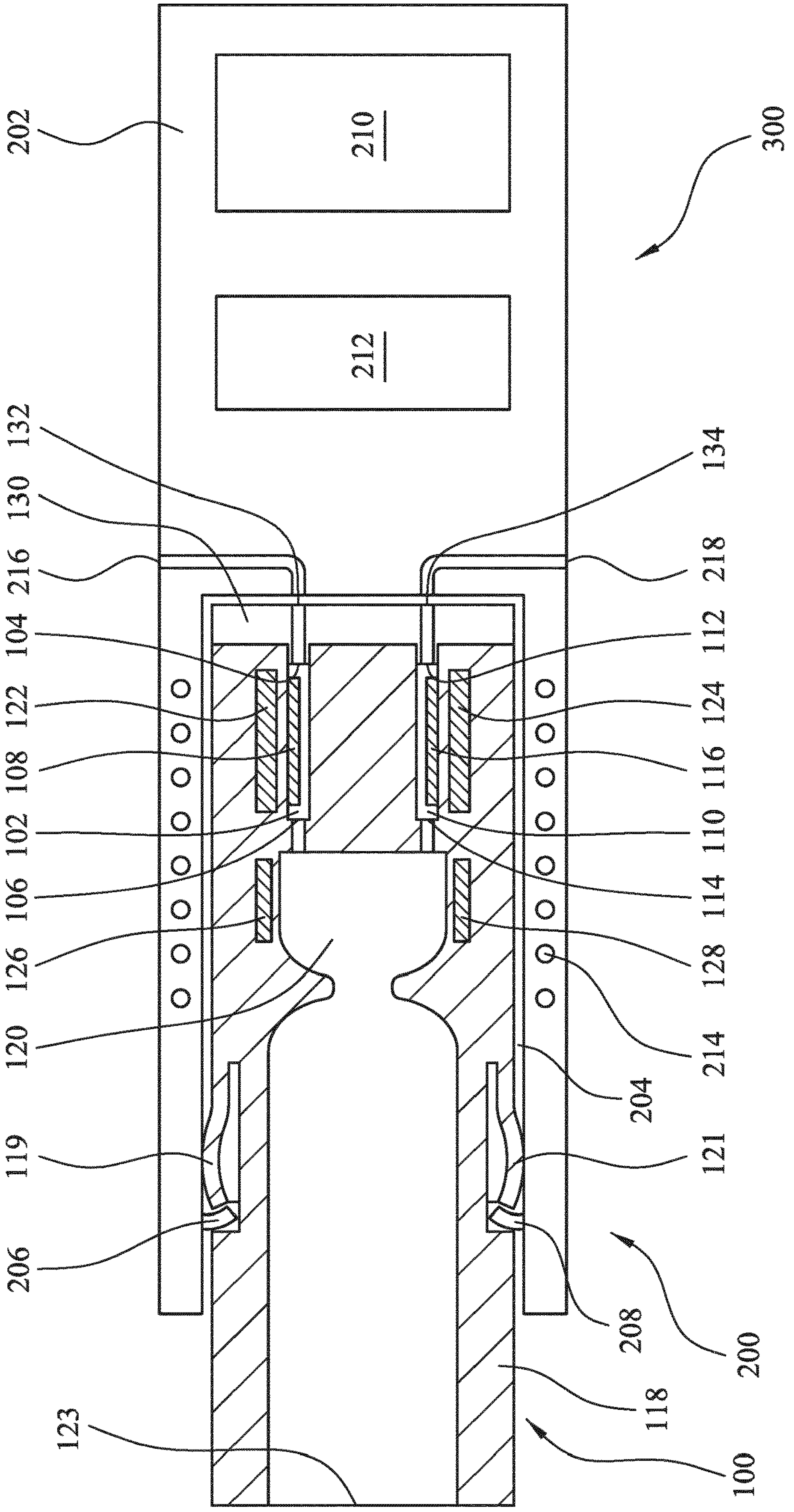
FIG. 3 is a schematic illustration of an aerosol-generating system.

FIG. 3 is an aerosol-generating system comprising the cartridge of FIG. 1 engaged with the aerosol-generating device of FIG. 2. The cartridge 100 is received in the cavity 204 of the aerosol-generating device and the first engaging device portion 206 and the second engaging device portion 208 engage the first engaging cartridge portion 119 and the second engaging cartridge portion 121 respectively to secure the cartridge in place.

The aerosol-generating system 300 further comprises a mouthpiece (not shown). A portion of the mouthpiece surrounds a portion of the cartridge. The mouthpiece engages the device housing 202 to secure the mouthpiece in position.

In use, the operation of the aerosol-generating system is as follows. A user draws on a downstream end of the mouthpiece. This action draws air in through the first air inlet 216 of the device and the second air inlet 218 of the device. The flow sensor in the aerosol-generating device 200 detects a change in air flow through the device which indicates that a user is taking a puff. The controller 212, in response to the detected change in air flow through the device, increases the power supplied from the power supply 210 to the inductor coil 214 from zero to an operational power. The power supply 210 provides an alternating electric current to the inductor coil 214 such that the inductor coil 214 generates an alternating magnetic field.

The alternating magnetic field generates eddy currents within the susceptor heating elements 122, 124, 126, 128, which are heated as a result. Further heating is provided by magnetic hysteresis losses within the susceptors. In this embodiment, the susceptors operate at temperatures between approximately 100 degrees Centigrade and approximately 200 degrees Centigrade. The susceptors heat the first and second compartments 102, 110 to temperatures between approximately 80 degrees Centigrade and approximately 150 degrees Centigrade. The susceptors heat the mixing chamber 120 to a temperature between approximately 60 degrees Centigrade and approximately 80 degrees Centigrade. Heating elements heat the nicotine source 108 and acid source 116 to volatise nicotine compounds and acid compounds.

Air flow through the first air inlet 216 of the device flows through the first cap aperture 132 then through the first air inlet 104 of the first compartment 102. This air flow entrains a volatised nicotine compound from the nicotine source 108 which has been heated by adjacent heating element 122. The air flow and entrained, volatised nicotine compound exit the first compartment 102 through the first air outlet 106 of the first compartment 102 into the mixing chamber 120.

Meanwhile, air flow through the second air inlet 218 of the device flows through the second cap aperture 134 then through the second air inlet 112 of the second compartment 110. This air flow entrains a volatised acid compound from the acid source 116 which has been heated by adjacent heating element 124. The air flow and entrained, volatised acid compound exit the second compartment 110 through the second air outlet 114 of the second compartment 110 into the mixing chamber 120.

The entrained nicotine compound mixes with the entrained acid compound in the mixing chamber 120. The mixing chamber 120 is heated by heating elements 126, 128. The nicotine compound reacts with the acid compound in the mixing chamber 120 to form an aerosol containing reacted nicotine and reacted acid which exits the cartridge 100 through the cartridge exit 123. The aerosol containing reacted nicotine and reacted acid then flows through a cavity defined by the mouthpiece and is delivered to the user.

Figure 4:
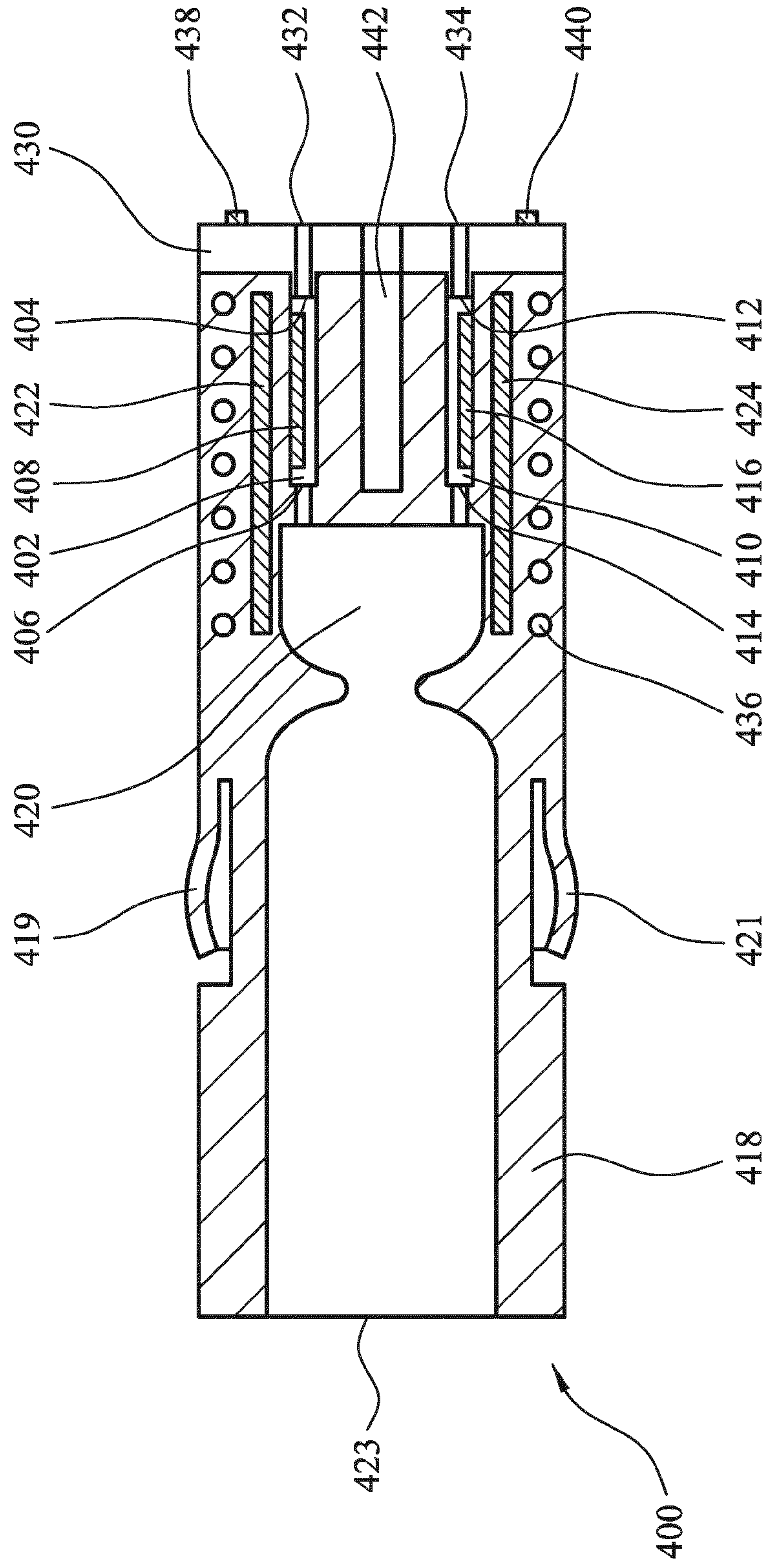
FIG. 4 is a schematic illustration of another cartridge for use in an aerosol-generating system.

FIG. 4 is a schematic illustration of a cartridge for use in an aerosol-generating system in accordance with a second embodiment. The cartridge 400 comprises a first compartment 402 having a first air inlet 404 and a first air outlet 406. The first compartment 402 also contains a nicotine source 408. The cartridge 400 further comprises a second compartment 410 having a second air inlet 412 and a second air outlet 414. The second compartment 410 also contains an acid source 416. The cartridge 400 further comprises a cartridge housing body 418 defining engaging cartridge portions 419, 421, a mixing chamber 420 and a cartridge exit 423. The mixing chamber 420 is positioned between the first and second compartment air outlets 406, 414 and the cartridge exit 423.

The cartridge 400 further comprises first heating element 422 and a second heating element 424. First heating element 422 is adjacent to the first compartment 402 and the mixing chamber 420 and, in use, heats the nicotine source 408 and the mixing chamber 420. Second heating element 424 is adjacent to the second compartment 410 and the mixing chamber 420, and, in use, heats the acid source 416 and the mixing chamber 420. The first and second heating elements are susceptors made from aluminium, though the cartridge 400 would function in much the same way if one or both of these heating elements were electrically resistive heating elements with connection to a power source. The cartridge 400 further comprises a cap 430 with a first cap aperture 432 and a second cap aperture 434. The cap 430 is positioned upstream of the first and second compartment air inlets 404, 412. The cartridge 400 further comprises an inductor coil 436 electrically connected to a first electrical contact 438 and a second electrical contact 440. The cartridge 400 further comprises a cavity 442 extending through the cap 430 and into the cartridge housing body 418. The cartridge further comprises a protrusion (not shown) on an outer surface of the cartridge body 418.

Figure 5:
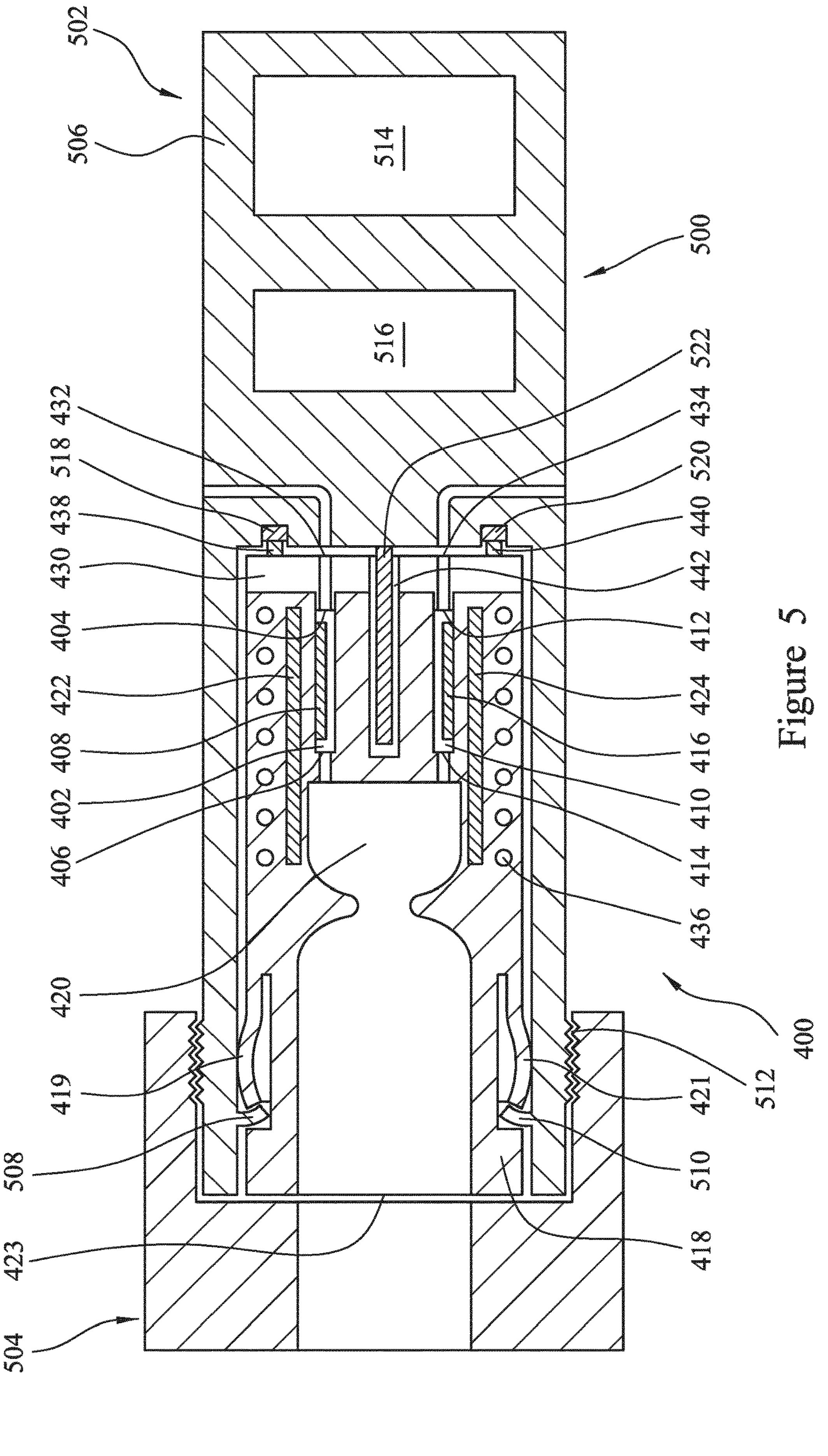
FIG. 5 is a schematic illustration of another aerosol-generating system.

FIG. 5 is a schematic illustration of an aerosol-generating system 500 comprising an aerosol-generating device 502 engaging the cartridge 400 of FIG. 4. FIG. 5 shows a mouthpiece 504 engaged with the aerosol-generating device 502. In this embodiment, the mouthpiece 504 engages the aerosol-generating device 502 via a screw thread, although any type of connection such as a snap fitting or simple push fitting may be used.

The aerosol-generating device 502 comprises a device housing 506 which defines a cavity and a first engaging device portion 508 and a second engaging device portion 510. The device housing 506 further defines screw threads 512. The aerosol-generating device further comprises a power supply 514. The power supply 514 is connected to a controller 516. The power supply 514 is also connected to first device contact 518 and a second device contact 520. The aerosol-generating device further comprises a first air inlet 524 and a second air inlet 526. When the cartridge 400 is engaged with the aerosol-generating device 502, the first air inlet 524 of the aerosol-generating device 502 is in fluid communication with the first cap aperture 432 of the cartridge 400 and the second air inlet 526 of the aerosol-generating device 502 is in fluid communication with the second cap aperture 434 of the cartridge 400. The aerosol-generating device 502 further comprises a flow sensor (not shown) configured to detect an air flow through an air flow passage between the first air inlet of the aerosol-generating device 502 and the first cap aperture 432 of the cartridge 400. The flow sensor is connected to the controller 516. The aerosol-generating device 502 further comprises an electrically resistive heating element 522 connected to both the power supply 514 and the controller 516. The controller 516 is configured to control the power supplied from the power supply 514 to the electrically resistive heating element 522 and, when the cartridge 400 is engaged with the aerosol-generating device 502, the inductor coil 436. When the cartridge 400 is engaged with the aerosol-generating device 502, the heating element 522 of the device is located within the cavity 442 of the cartridge 400. In this embodiment, the electrically resistive heating element 522 is an electrically resistive track on a flexible substrate. Specifically, the heating element comprises a metallic etched foil forming a track, held between two layers of KAPTON®. The aerosol-generating device 502 further comprises a recess (not shown) which corresponds to the protrusion on the outer surface of the cartridge body 418.

Operation of the aerosol-generating system 500 is as follows. The cartridge 400 is inserted into the cavity defined by the aerosol-generating device 502. The protrusion of the outer surface of the cartridge body 418 and the corresponding recess of the aerosol-generating device 502 cooperate to ensure that the cartridge 400 can engage the aerosol-generating device 502 in only one orientation. This ensures that the heating element 522 of the aerosol-generating device can be located in the cavity 442 of the cartridge 400 quickly and easily. The first and second engaging portions 419, 421 of the cartridge 400 engage the first and second engaging portions 508, 510 of the aerosol-generating device 502 respectively. In this engaged positon, the first electrical contact 438 and the second electrical contact 440 of the cartridge 400 engage the first device contact 518 and the second device contact 520 respectively. Thus, in this engaged position, the inductor coil 436 is connected to the power supply 514. The mouthpiece 504 then engages the screw threads 512 of the aerosol-generating device 502.

A user draws on a downstream end of the mouthpiece 504. This action draws air in through the first and second air inlets of the aerosol-generating device 502. The flow sensor in the aerosol-generating device 502 detects a change in air flow through the device which indicates that a user is taking a puff. The controller 516 increases the power supplied from the power supply 514 to the inductor coil 436 from zero to an inductor coil operational power and the power supplied to the heating element 522 from zero to a heating element operational power. The power supply 514 provides an alternating electric current to the inductor coil 436 such that the inductor coil 436 generates an alternating magnetic field.

The alternating magnetic field generates eddy currents within the susceptor heating elements 422, 424, which are heated as a result. Further heating is provided by magnetic hysteresis losses within the susceptors. Heating elements 422, 424 heat the first compartment 402 and second compartment 410 to temperatures between approximately 80 degrees Centigrade and approximately 150 degrees Centigrade. This heats the nicotine source 408 and acid source 416 to volatise nicotine compounds and acid compounds.

Air flow through the first air inlet 524 of the device flows through the first cap aperture 432 then through the first air inlet 404 of the first compartment 102. This air flow entrains a volatised nicotine compound from the nicotine source 408 which has been heated by adjacent susceptor heating element 422 and electrically resistive heating element 522. The air flow and entrained nicotine compound exit the first compartment 402 through the first air outlet 406 of the first compartment 402 into the mixing chamber 420.

Meanwhile, air flow through the second air inlet 526 of the device flows through the second cap aperture 434 then through the second air inlet 412 of the second compartment 410. This air flow entrains a volatised acid compound from the acid source 408 which has been heated by adjacent susceptor heating element 424 and electrically resistive heating element 522. The air flow and entrained acid compound exit the second compartment 410 through the second air outlet 414 of the second compartment 410 into the mixing chamber 420.

The entrained nicotine compound mixes with the entrained acid compound in the mixing chamber 420. The mixing chamber 420 is heated by heating elements 422, 424 to a temperature of between approximately 60 degrees Centigrade and approximately 80 degrees Centigrade. The nicotine compound reacts with the acid compound in the mixing chamber 420 to form an aerosol containing reacted nicotine and reacted acid which exits the cartridge 400 through the cartridge exit 423. The aerosol containing reacted nicotine and reacted acid then flows through the downstream end of the mouthpiece 504 and is delivered to the user.

Figure 6:
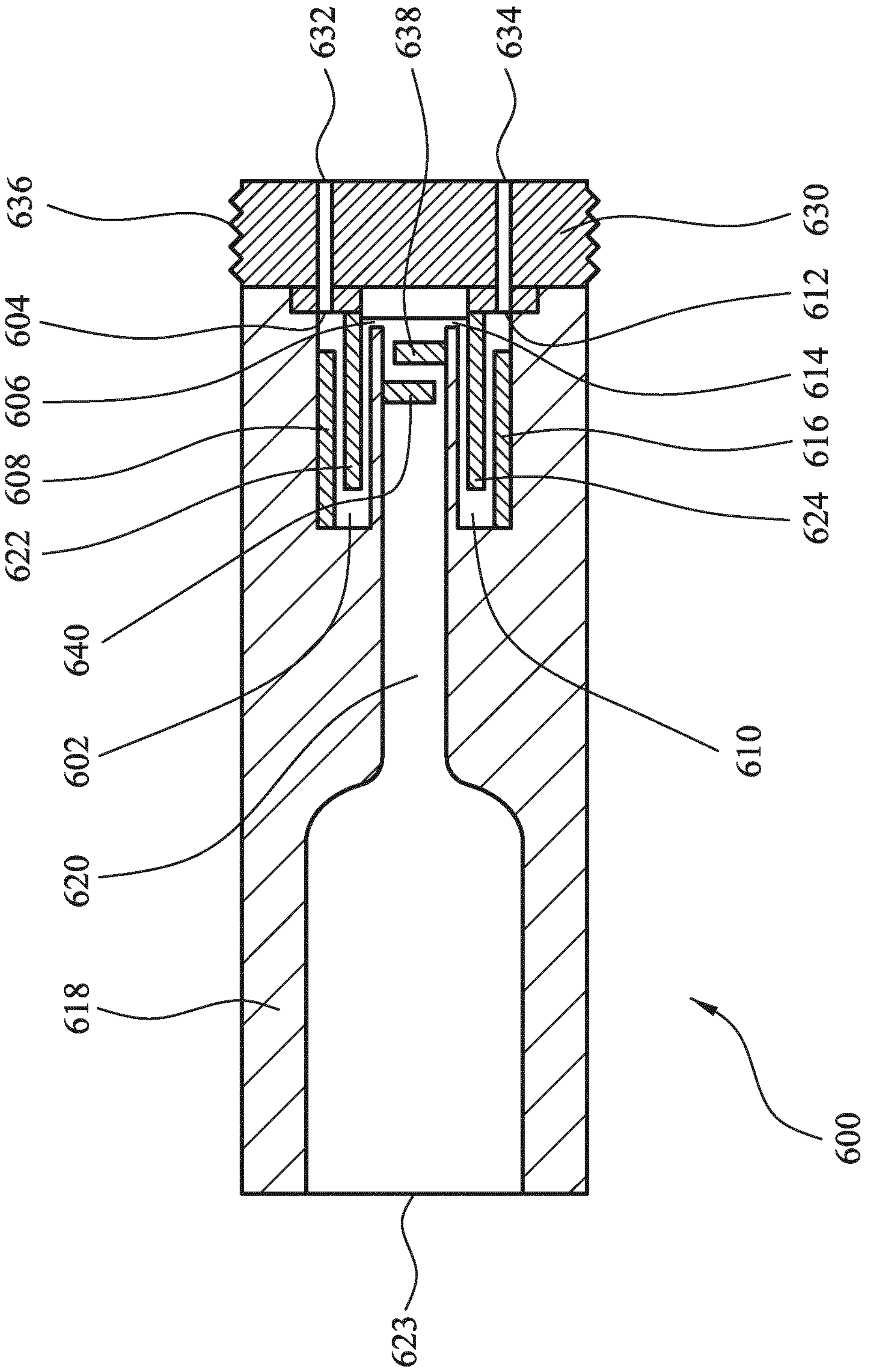
FIG. 6 is a schematic illustration of another cartridge for use in an aerosol-generating system.

FIG. 6 is a schematic illustration of a cartridge for use in an aerosol-generating system in accordance with a third embodiment. The cartridge 600 comprises a first compartment 602 having a first air inlet 604 and a first air outlet 606. The first compartment 602 contains a nicotine source 608. The cartridge 600 further comprises a second compartment 610 having a second air inlet 612 and a second air outlet 614. The second compartment 610 contains an acid source 616. The cartridge 600 further comprises a cartridge housing body 618 defining a mixing chamber 620 and a cartridge exit 623. The mixing chamber 620 is positioned between the first and second compartment air outlets 606, 614 and the cartridge exit 623. The cartridge 600 further comprises a cap 630 with a first cap aperture 632 and a second cap aperture 634. The cap 630 defines screw thread 636. The cap 630 is positioned upstream of the first and second compartment air inlets 604, 612.

The cartridge 600 further comprises a first heating element 622 and a second heating element 624. First heating element 622 is located within the first compartment 602. In use, the first heating element 622 heats the nicotine source 608 and the mixing chamber 620. Second heating element 624 is located within the second compartment 610. In use, the second heating element 624 heats the acid source 616 and the mixing chamber 620. The first and second heating elements are susceptors, though the cartridge 600 would function in much the same way if one or more of these heating elements were electrically resistive heating elements with connection to a power source.

In the cartridge 600 of FIG. 6, a portion of the mixing chamber 620 is located between the first compartment 602 and the second compartment 604. The cartridge 600 further comprises flow obstructions 638, 640.

Figure 7:
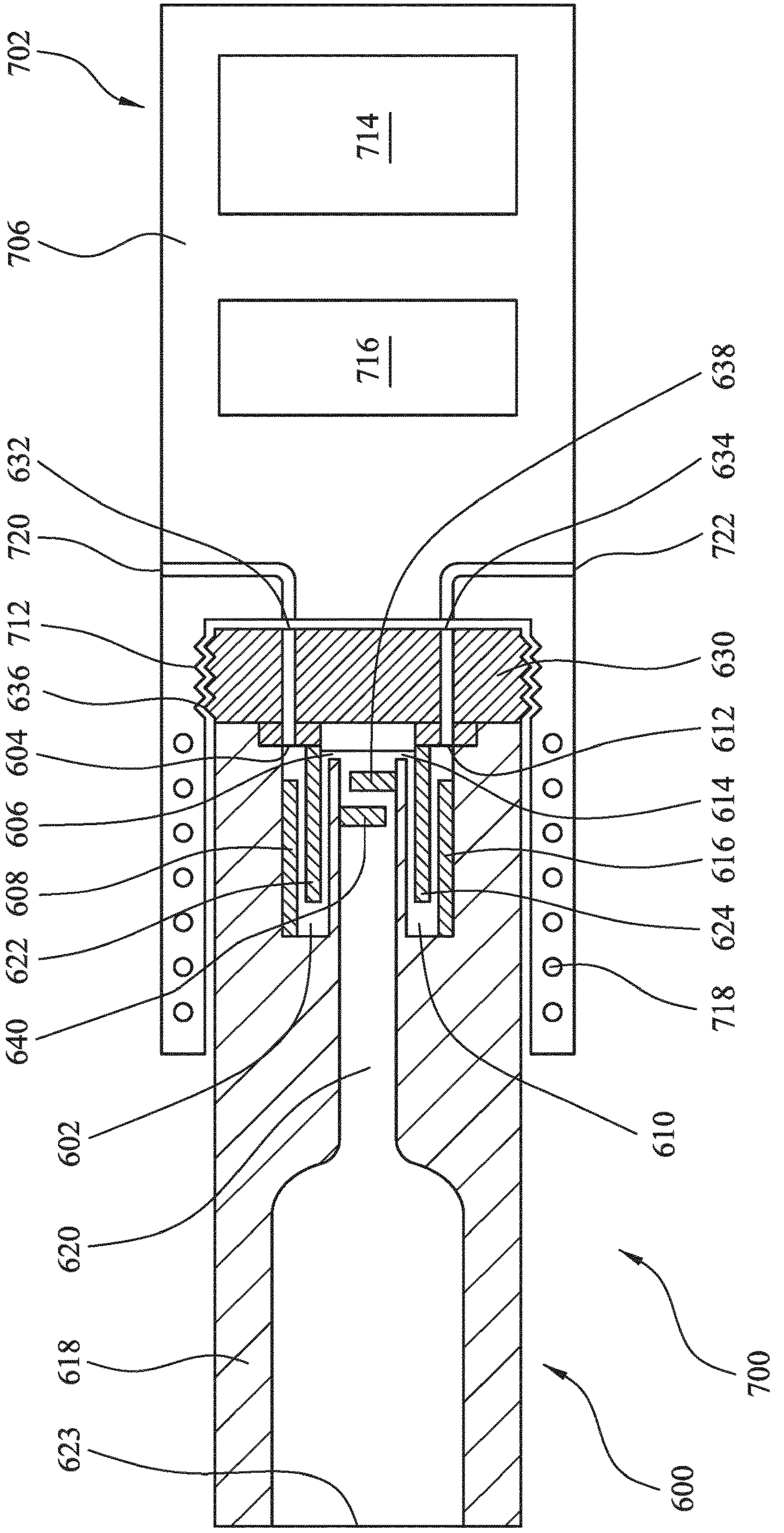
FIG. 7 is a schematic illustration of another an aerosol-generating system.

FIG. 7 is a schematic illustration of an aerosol-generating system 700 comprising an aerosol-generating device 702 engaging the cartridge 600 of FIG. 6.

The aerosol-generating device 702 comprises a device housing 706 which defines a cavity for receiving a portion of cartridge 600. The device housing 706 further defines screw thread 712 which cooperates with screw thread 636 of the cartridge 600 to secure the cartridge in engagement with the aerosol-generating device 702. In this embodiment, the cartridge 600 engages the aerosol-generating device 502 via a screw thread, although with trivial modifications any type of connection such as a snap fitting or simple push fitting may be used.

The aerosol-generating device further comprises a power supply 714. The power supply 714 is connected to a controller 716. The power supply 714 is also connected to an inductor coil 718. The aerosol-generating device further comprises a first air inlet 720 and a second air inlet 722. When the cartridge 600 is engaged with the aerosol-generating device 702, the first air inlet 720 of the aerosol-generating device is in fluid communication with the first cap aperture 632 of the cartridge 600 and the second air inlet 722 of the aerosol-generating device 702 is in fluid communication with the second cap aperture 634 of the cartridge 600. The aerosol-generating device 702 further comprises a flow sensor (not shown) configured to detect an air flow through an air flow passage between the first air inlet 720 of the aerosol-generating device 702 and the first cap aperture 632 of the cartridge 600. The flow sensor is connected to the controller 716.

Operation of the aerosol-generating system 700 is as follows. The cartridge 600 is inserted into the cavity defined by the aerosol-generating device 702. The screw thread 636 cooperates with the screw thread 712.

A user draws on a downstream end, or mouthpiece portion, of the cartridge 600. This action draws air in through the first and second air inlets of the aerosol-generating device 702. The flow sensor in the aerosol-generating device 702 detects a change in air flow through the device which indicates that a user is taking a puff. The controller 716 increases the power supplied from the power supply 714 to the inductor coil 718 from zero to an inductor coil operational power. The power supply 714 provides an alternating electric current to the inductor coil 436 such that the inductor coil 718 generates an alternating magnetic field.

The alternating magnetic field generates eddy currents within the susceptor heating elements 622, 624 which are heated as a result. Further heating is provided by magnetic hysteresis losses within the susceptors. The susceptors heat the first compartment 602 and the second compartment 610 to approximately 100 degrees Centigrade. This heats the nicotine source 608 and acid source 616 to volatise a nicotine compound and an acid compound.

Air flow through the first air inlet 720 of the device 702 flows through the first cap aperture 632 then through the first air inlet 604 of the first compartment 602. This air flow entrains a volatised nicotine compound from the nicotine source 608 which has been heated by the susceptor heating element 622. The air flow and entrained nicotine compound exit the first compartment 602 through the first air outlet 606 of the first compartment 602 into the mixing chamber 620.

Meanwhile, air flow through the second air inlet 722 of the device 702 flows through the second cap aperture 634 then through the second air inlet 612 of the second compartment 610. This air flow entrains a volatised acid compound from the acid source 608 which has been heated by the susceptor heating element 624. The air flow and entrained acid compound exit the second compartment 610 through the second air outlet 614 of the second compartment 610 into the mixing chamber 620.

The entrained nicotine compound mixes with the entrained acid compound in the mixing chamber 620. The mixing chamber 620 is heated by heating elements 622, 624 to a temperature of approximately 70 degrees Centigrade. The air flows and entrained nicotine compound and acid compound contact the flow obstructions 638, 640 in the mixing chamber 620. The flow obstructions 638, 640 help to mix the air flows and entrained compounds by changing flow directions of portions of the air flows. The nicotine compound reacts with the acid compound in the mixing chamber 620 to form an aerosol containing reacted nicotine and reacted acid which exits the cartridge 600 through the cartridge exit 623. The aerosol containing reacted nicotine and reacted acid then flows through the mouthpiece portion of the cartridge and is delivered to the user.

Figure 8:
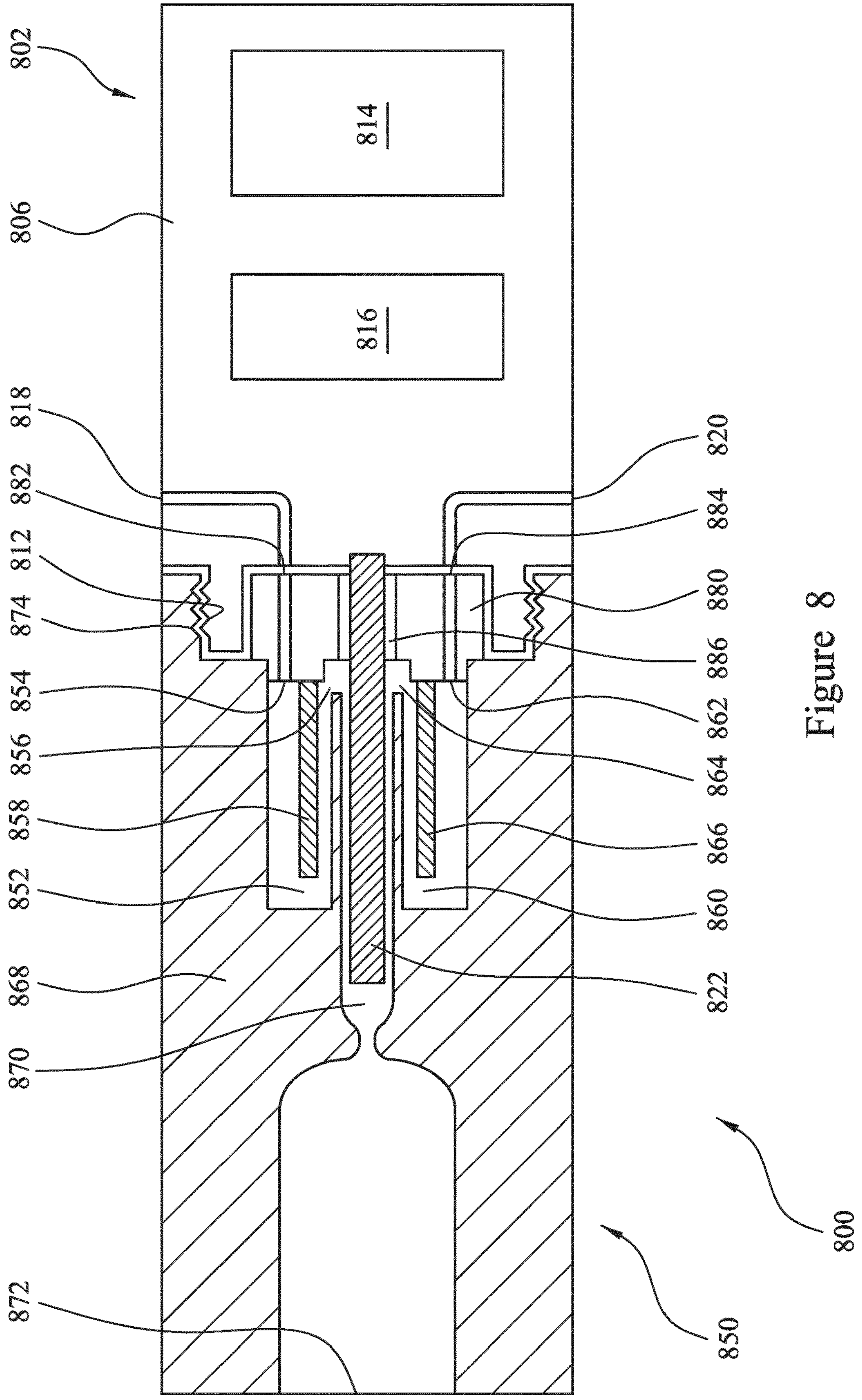
FIG. 8 is a schematic illustration of another aerosol-generating system.

FIG. 8 is a schematic illustration of an aerosol-generating system 800 in accordance with a fourth embodiment comprising an aerosol-generating device 802 engaging a cartridge 850.

The aerosol-generating device 802 comprises a device housing 806 which defines a screw thread 812. The aerosol-generating device 802 further comprises a power supply 814. The power supply 814 is connected to a controller 816. The aerosol-generating device further comprises a first air inlet 818 and a second air inlet 820. The aerosol-generating device further comprises a flow sensor (not shown) configured to detect an air flow through an air flow passage between the first air inlet of the aerosol-generating device and the first cap aperture of the cartridge. The flow sensor is connected to the controller 816. The aerosol-generating device further comprises an electrically resistive heating element 822 connected to the power supply 814 and the controller 816.

The cartridge 850 comprises a first compartment 852 having a first air inlet 854 and a first air outlet 856. The first compartment 852 also contains a nicotine source 858. The cartridge 850 further comprises a second compartment 860 having a second air inlet 862 and a second air outlet 864. The second compartment 860 also contains an acid source 866. The cartridge 850 further comprises a cartridge housing body 868 defining a mixing chamber 870, a cartridge exit 872 and a screw thread 874. The mixing chamber 870 is positioned between the first and second compartment air outlets 856, 864 and the cartridge exit 872. The cartridge 850 further comprises a cap 880 with a first cap aperture 882 and a second cap aperture 884. The cap 880 is positioned upstream of the first and second compartment air inlets 854, 862. The cartridge 850 further comprises a cavity 886 extending through the cap 880 and into the cartridge housing body 868.

When the cartridge 850 is engaged with the aerosol-generating device, the first air inlet of the aerosol-generating device is in fluid communication with the first cap aperture 882 of the cartridge 850 and the second air inlet of the aerosol-generating device is in fluid communication with the second cap aperture 884 of the cartridge 850. When the cartridge 850 is engaged with the aerosol-generating device 802, the heating element 822 of the device is located within the cavity 886 of the cartridge 850.

Operation of the aerosol-generating system 800 is as follows. The cartridge 850 is inserted into the cavity 886 defined by the aerosol-generating device. The screw thread 812 of the device engages the screw thread 874 of the cartridge 850.

A user draws on a downstream end of a mouthpiece (not shown) which is removably attached to a downstream end of the cartridge. This action draws air in through the first and second air inlets of the aerosol-generating device 802. The flow sensor in the aerosol-generating device 802 detects a change in air flow through the device which indicates that a user is taking a puff. The controller 816 increases the power supplied from the power supply 814 to the electrically resistive heating element 822 from zero to an operational power. The temperature of the heating element 822 increases as a result to approximately 100 degrees Centigrade. The heating element 822 heats the first compartment and the second compartment to approximately 80 degrees Centigrade. The heats the nicotine source 858 and the acid source 866 to volatise nicotine and acid compounds.

Air flow through the first air inlet of the device flows through the first cap aperture 882 then through the first air inlet 854 of the first compartment 852. This air flow entrains a volatised nicotine compound from the nicotine source 858 which has been heated by heating element 822. The air flow and entrained, volatised nicotine compound exit the first compartment 852 through the first air outlet 856 of the first compartment 852 into the mixing chamber 870.

Meanwhile, air flow through the second air inlet of the device flows through the second cap aperture 884 then through the second air inlet 862 of the second compartment 860. This air flow entrains a volatised acid compound from the acid source 866 which has been heated by heating element 822. The air flow and entrained, volatised acid compound exit the second compartment 860 through the second air outlet 864 of the second compartment 860 into the mixing chamber 870.

The entrained, volatised nicotine compound mixes with the entrained, volatised acid compound in the mixing chamber 870. The mixing chamber is heated by heating element 822 to a temperature of approximately 80 degrees Centigrade. The volatised nicotine compound reacts with the volatised acid compound in the mixing chamber 870 to form an aerosol containing reacted nicotine and reacted acid which exits the cartridge 850 through the cartridge exit 873. The aerosol containing reacted nicotine and reacted acid then flows through the downstream end of the mouthpiece and is delivered to the user.

Figure 9:
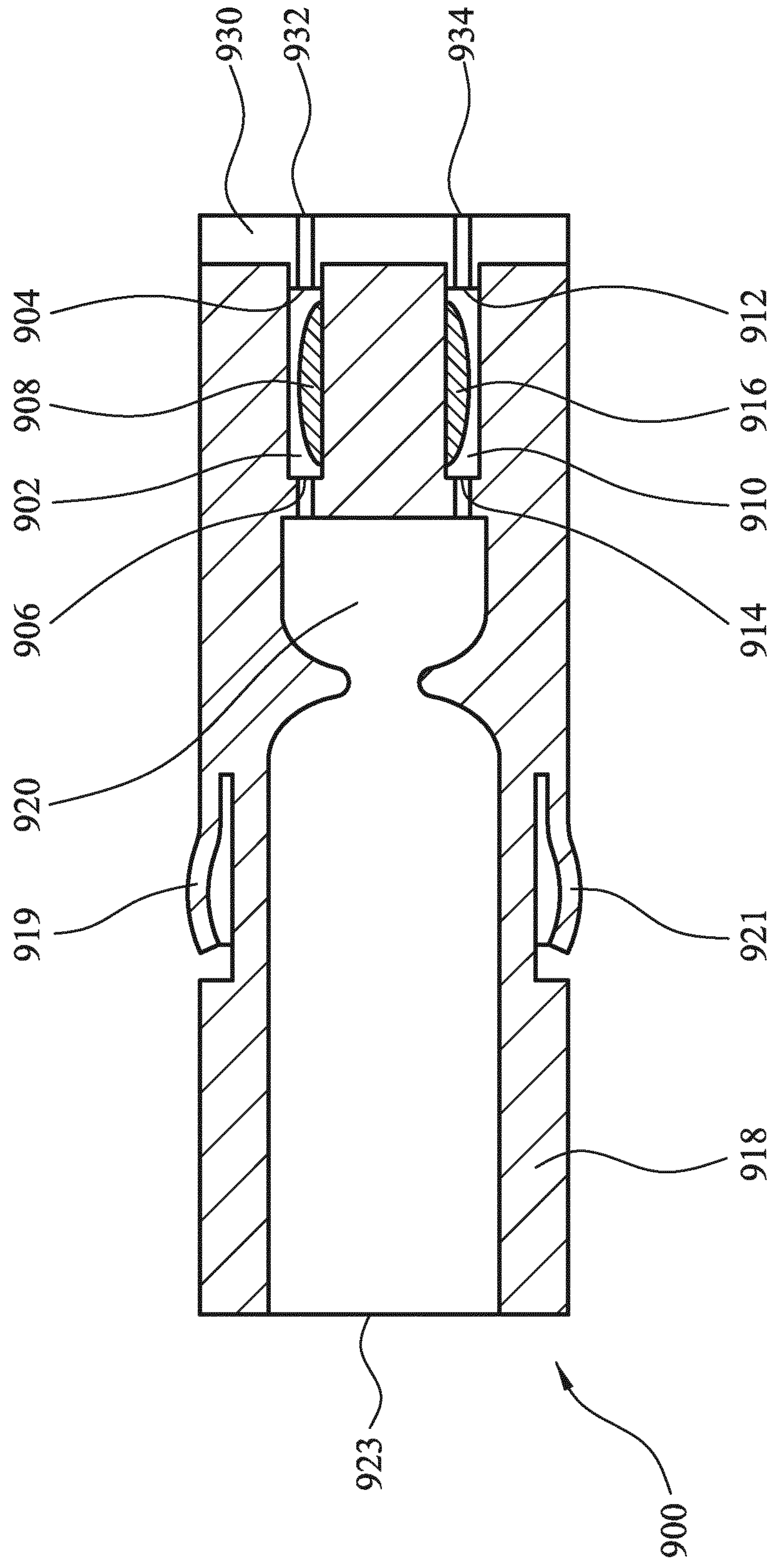
FIG. 9 is a schematic illustration of another cartridge for use in an aerosol-generating system.

FIG. 9 is a schematic illustration of a cartridge for use in an aerosol-generating system in accordance with a fifth embodiment. The cartridge 900 comprises a first compartment 902 having a first air inlet 904 and a first air outlet 906. The first compartment 902 also contains a nicotine source 908. The cartridge 900 further comprises a second compartment 910 having a second air inlet 912 and a second air outlet 914. The second compartment 910 also contains an acid source 916. The cartridge 900 further comprises a cartridge housing body 918 defining engaging cartridge portions 919, 921, a mixing chamber 920 and a cartridge exit 923. The mixing chamber 920 is positioned between that first and second compartment air outlets 906, 914 and the cartridge exit 923. The cartridge 900 further comprises a cap 930 with a first cap aperture 932 and a second cap aperture 934. The cap 930 is positioned upstream of the first and second compartment air inlets 904, 912.

Figure 10:
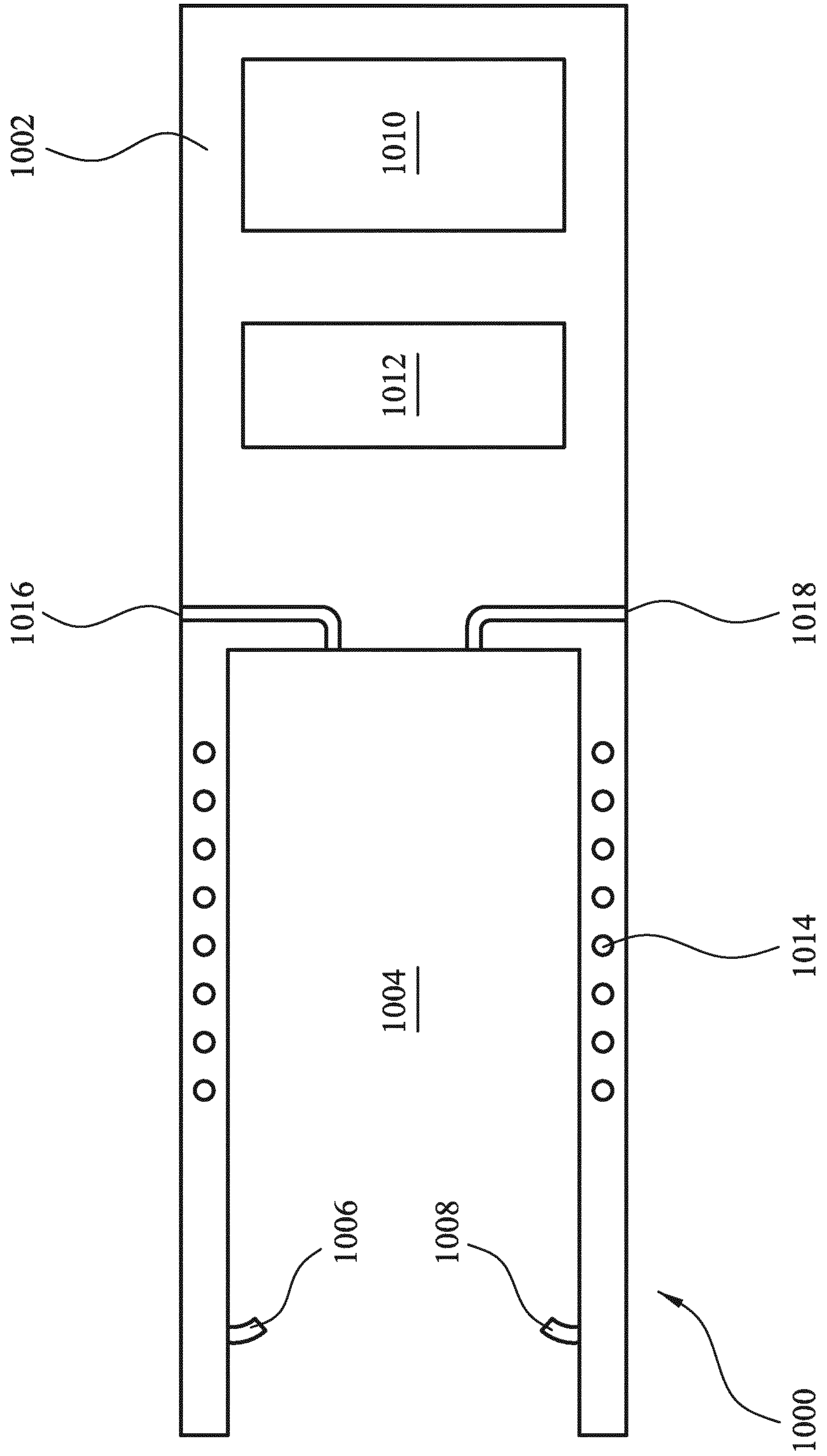
FIG. 10 is a schematic illustration of another aerosol-generating device.

FIG. 10 is a schematic illustration of an aerosol-generating device. The aerosol-generating device 1000 is compatible with the cartridge 900 shown in FIG. 9. The aerosol-generating device 1000 comprises a device housing 1002 which defines a cavity 1004 and a first engaging device portion 1006 and a second engaging device portion 1008. The aerosol-generating device further comprises a power supply 1010 connected to a controller 1012. The aerosol-generating device 1000 further comprises an electrically resistive coil 1014 disposed around a portion of the cavity 1004. The coil 1014 is connected to the controller 1012. The aerosol-generating device further comprises a first air inlet 1016 and a second air inlet 1018. The aerosol-generating device further comprises a temperature sensor (not shown), and a user interface including a user button (not shown). The user interface further comprises a screen for presenting information relating to the aerosol-generating device 1000 to the user.

In use, a user presses the user button and the power supply 1010 connected to the coil 1014 provides an electric current to the coil 1014 such that the temperature of the coil 1014 increases. This heats the first compartment 902 and the second compartment 910 to temperatures of between approximately 80 degrees Centigrade and approximately 100 degrees Centigrade. This heats the nicotine source 908 and acid source 916 to volatise nicotine and acid compounds.

Figure 11:
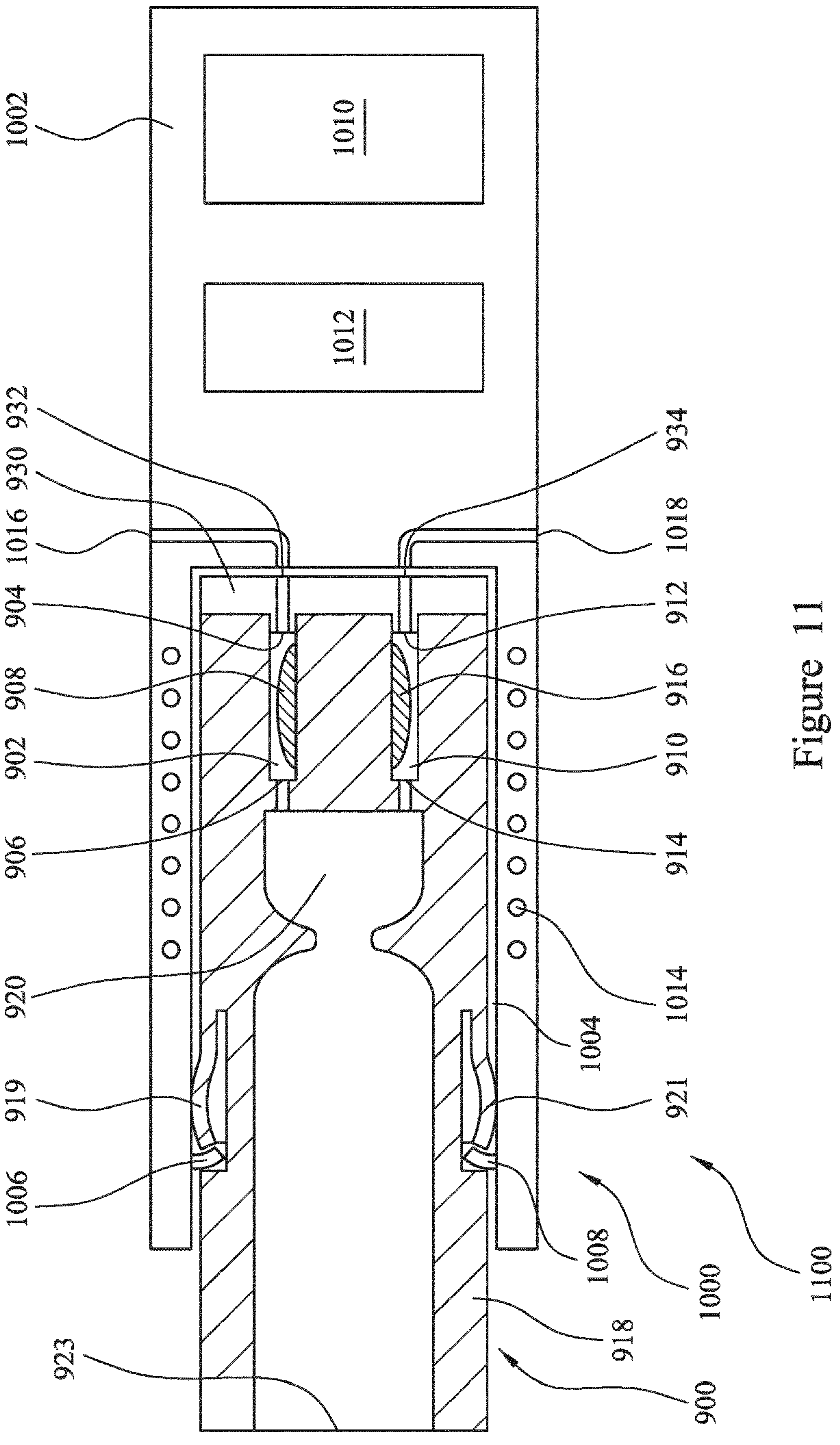
FIG. 11 is a schematic illustration of another aerosol-generating system.

FIG. 11 is an aerosol-generating system comprising the cartridge of FIG. 9 engaged with the aerosol-generating device of FIG. 10. To engage the cartridge 900 with the aerosol-generating device 1002, the cartridge 900 is received in the cavity 1004 of the aerosol-generating device 1002 and the first engaging device portion 1006 and the second engaging device portion 1008 engage the first engaging cartridge portion 919 and the second engaging cartridge portion 921 respectively. This secures the cartridge in place.

When the cartridge 900 is engaged with the aerosol-generating device 1000, the coil 1014 surrounds the first compartment 902, the second compartment 910, and a portion of the mixing chamber 920.

The aerosol-generating system 1100 further comprises a mouthpiece (not shown). A portion of the mouthpiece surrounds a portion of the cartridge. The mouthpiece engages the device housing 1002 to secure the mouthpiece in position.

In use, the operation of the aerosol-generating system is as follows. A user draws on a downstream end of the mouthpiece. This action draws air in through the first air inlet 1016 of the device and the second air inlet 1018 of the device. The user presses the user button. This increases the power supplied from the power supply 1010 to the coil 1014 from zero to an operational power. The temperature of the coil 1014 increases and, as a result, heats the first compartment 902, the second compartment 910, and the mixing chamber 920. This mixing chamber is heated to a temperature between approximately 60 degrees Centigrade and 80 degrees Centigrade. In this embodiment, the system operates in a continuous heating mode. This means that the coil 1014 heats the first compartment, 902, the second compartment 910, and the mixing chamber 920 throughout an operating session rather than in response to sensed user puffs. A temperature sensor and a screen are provided in the aerosol-generating device 1000 so that a user can be provided with an indication of when an operating temperature has been reached. During operation, the coil operates at approximately 200 degrees Centigrade. The heater may operate for a fixed period of time after activation, say 5 minutes, or may operate until a user stops the power supply 1010 from supplying power to the coil 1014 off by pressing the user button again.

Air flow through the first air inlet 1016 of the device flows through the first cap aperture 932 then through the first air inlet 904 of the first compartment 902. This air flow entrains a volatised nicotine compound from the nicotine source 908 which has been heated by adjacent heating element 922. The air flow and entrained, volatised nicotine compound exit the first compartment 902 through the first air outlet 906 of the first compartment 902 into the mixing chamber 920.

Meanwhile, air flow through the second air inlet 1018 of the device flows through the second cap aperture 934 then through the second air inlet 912 of the second compartment 910. This air flow entrains a volatised acid compound from the acid source 908 which has been heated by coil 1014. The air flow and entrained, volatised acid compound exit the second compartment 910 through the second air outlet 914 of the second compartment 910 into the mixing chamber 920.

The entrained, volatised nicotine compound mixes with the entrained, volatised acid compound in the mixing chamber 920. The mixing chamber is heated by coil 1014. The nicotine compound reacts with the acid compound in the mixing chamber 920 to form an aerosol containing reacted nicotine and reacted acid which exits the cartridge 900 through the cartridge exit 923. The aerosol containing reacted nicotine and reacted acid then flows through a cavity defined by the mouthpiece and is delivered to the user.

The figures show particular embodiments of the invention. However, it should be clear that changes may be made to the described embodiments within the scope of the invention. Features described in relation to one embodiment may be applied to one or more of the other embodiments.

Advantageously, all of the embodiments described herein comprise a heating element configured to heat the mixing chamber to achieve an increased rate of reaction between nicotine and acid in the mixing chamber.

The invention claimed is:

1. A cartridge for an aerosol-generating system, the cartridge comprising:

a first compartment having a first air inlet and a first air outlet, the first air inlet being upstream of the first air outlet, the first compartment containing a nicotine source;

a second compartment having a second air inlet and a second air outlet, the second air inlet being upstream of the second air outlet, the second compartment containing an acid source;

a mixing chamber configured for mixing nicotine from the nicotine source in the first compartment and acid from the acid source in the second compartment with an air flow to form an aerosol, the mixing chamber being downstream of both the first air outlet of the first compartment and the second air outlet of the second compartment; and a heating element configured to heat the mixing chamber, wherein at least a portion of the heating element is neither upstream nor downstream of the mixing chamber, wherein a first portion of the heating element is disposed adjacent to the first compartment or the second compartment, or both the first compartment and the second compartment, and a second portion of the heating element is disposed adjacent to, or within, the mixing chamber.

2. The cartridge according to claim 1, wherein the heating element is further configured to heat the mixing chamber to a temperature of between 60 degrees Centigrade and 80 degrees Centigrade.

3. The cartridge according to claim 2, wherein a temperature of the first compartment or a temperature of the second compartment, or both a temperature of the first compartment and a temperature of the second compartment, does not exceed 250 degrees Centigrade.

4. The cartridge according to claim 1, wherein the heating element comprises a susceptor or an electrically resistive heating element, or both a susceptor and an electrically resistive heating element.

5. The cartridge according to claim 1, wherein at least a portion of the mixing chamber is disposed between the first compartment and the second compartment.

6. The cartridge according to claim 1, wherein the mixing chamber comprises one or more flow obstructions configured to change a flow direction of at least a portion of the air flow.

7. The cartridge according to claim 1, wherein the heating element is an electrically resistive wire coil and at least a portion of the wire coil is disposed around at least a portion of the mixing chamber.

8. The cartridge according to claim 1, wherein a first portion of the heating element is configured to heat the first compartment or the second compartment, or both the first compartment and the second compartment, and a second portion of the heating element is configured to heat the mixing chamber.

9. An aerosol-generating system, comprising:

a cartridge according to claim 1; and an aerosol-generating device comprising a power supply, the power supply being configured to supply power to the heating element when the cartridge is engaged with the device.

10. The aerosol-generating system according to claim 9, wherein the aerosol-generating device further comprises a second heating element, at least a portion of the second heating element being configured to heat the first compartment or the second compartment, or both the first compartment and the second compartment.

11. An aerosol-generating system, comprising:

a cartridge for the aerosol-generating system, the cartridge comprising:

a first compartment having a first air inlet and a first air outlet, the first air inlet being upstream of the first air outlet, the first compartment containing a nicotine source, a second compartment having a second air inlet and a second air outlet, the second air inlet being upstream of the second air outlet, the second compartment containing an acid source, a mixing chamber configured for mixing nicotine from the nicotine source and acid from the acid source with an air flow to form an aerosol, the mixing chamber being downstream of both the first air outlet of the first compartment and the second air outlet of the second compartment, and a heating element configured to heat the mixing chamber; and an aerosol-generating device comprising a housing and a power supply, the power supply being configured to supply power to the heating element, wherein at least a portion of the cartridge is configured to engage the housing, and at least a portion of the heating element is neither upstream nor downstream of the mixing chamber, wherein a first portion of the heating element is disposed adjacent to the first compartment or the second compartment, or both the first compartment and the second compartment, and a second portion of the heating element is disposed adjacent to, or within, the mixing chamber.

12. A cartridge for an aerosol-generating system, the cartridge comprising:

a first compartment containing a nicotine source;

a second compartment containing an acid source;

a mixing chamber configured for mixing nicotine from the nicotine source and acid from the acid source with an air flow to form an aerosol; and a heating element configured to heat the mixing chamber, wherein at least a portion of the heating element is configured to heat the mixing chamber to a temperature of between 60 degrees Centigrade and 80 degrees Centigrade, wherein a first portion of the heating element is disposed adjacent to the first compartment or the second compartment, or both the first compartment and the second compartment, and a second portion of the heating element is disposed adjacent to, or within, the mixing chamber.

13. An aerosol-generating system, comprising:

a cartridge for use in the aerosol-generating system, the cartridge comprising:

a first compartment containing a nicotine source, a second compartment containing an acid source, and a mixing chamber configured for mixing nicotine from the nicotine source and acid from the acid source with an air flow to form an aerosol; and an aerosol-generating device comprising a heating element and a housing, wherein at least a portion of the cartridge is configured to engage the housing, and at least a portion of the heating element is configured to beat the mixing chamber to a temperature of between 60 degrees Centigrade and 80 degrees Centigrade, wherein a first portion of the heating element is disposed adjacent to the first compartment or the second compartment, or both the first compartment and the second compartment, and a second portion of the heating element is disposed adjacent to, or within the mixing chamber.

14. A method for aerosol generation in an aerosol-generating system, the aerosol-generating system comprising:

a cartridge for the aerosol-generating system, the cartridge comprising:

a first compartment containing a nicotine source, a second compartment containing an acid source, a mixing chamber configured for mixing nicotine from the nicotine source and acid from the acid source with an air flow to form an aerosol, and a heater; and an aerosol-generating device comprising a housing, wherein the housing is configured to engage at least a portion of the cartridge, wherein the heater comprises a first portion and a second portion or wherein the heater comprises a first heating element and a second beating element; and the method comprising:

supplying power to the heater such that the first portion of the heater heats the first compartment or the second compartment, or both the first compartment and the second compartment, and such that the second portion of the heater heats the mixing chamber, or supplying power to the first heating element such that the first heating element heats the first compartment or the second compartment, or both the first compartment and the second compartment, and supplying power to the second heating element such that the second heating element heats the mixing chamber.

* * * * *